US011416804B2

(12) United States Patent
Heinla et al.

(10) Patent No.: US 11,416,804 B2
(45) Date of Patent: Aug. 16, 2022

(54) METHOD AND SYSTEM FOR DELIVERING ITEMS

(71) Applicant: Starship Technologies OÜ, Tallinn (EE)

(72) Inventors: Ahti Heinla, Tallinn (EE); Allan Martinson, Tallinn (EE)

(73) Assignee: Starship Technologies OÜ, Tallinn (EE)

( * ) Notice: Subject to any disclaimer, the term of this patent is extended or adjusted under 35 U.S.C. 154(b) by 0 days.

(21) Appl. No.: 16/059,227

(22) Filed: Aug. 9, 2018

(65) Prior Publication Data

US 2018/0349834 A1 Dec. 6, 2018

Related U.S. Application Data

(63) Continuation of application No. PCT/EP2017/064019, filed on Jun. 8, 2017.

(30) Foreign Application Priority Data

Jun. 17, 2016 (EP) .................................. 16175135
Sep. 1, 2016 (EP) .................................. 16186907

(51) Int. Cl.
*G06Q 10/08* (2012.01)
*G06Q 50/28* (2012.01)

(52) U.S. Cl.
CPC .......... *G06Q 10/083* (2013.01); *G06Q 10/08* (2013.01); *G06Q 50/28* (2013.01); *G06Q 2250/50* (2013.01)

(58) Field of Classification Search
CPC ...... G06Q 50/28; G06Q 10/083; G06Q 10/08; G06Q 10/087; G06Q 10/0833;

(Continued)

(56) References Cited

U.S. PATENT DOCUMENTS 4,549,841 A   10/1985  Ishige
5,664,928 A    9/1997  Stauber (Continued)

FOREIGN PATENT DOCUMENTS

WO   WO 2011/035839   3/2011
WO   WO 2017/156586   9/2017
WO   WO 2017/196759   11/2017

OTHER PUBLICATIONS

Stansbury, R. S. (2007). Constraint-based task selection and configuration for autonomous mobile robots (3267822). Available from ProQuest Dissertations and Theses Professional. (304834825). Retrieved from https://dialog.proquest.com/professional/docview/304834825?accountid=131444 (Year: 2007).*

(Continued)

*Primary Examiner* — Michael P Harrington
(74) *Attorney, Agent, or Firm* — Womble Bond Dickinson (US) LLP

(57) ABSTRACT

A method for delivering a plurality of items to a plurality of delivery locations uses a mobile transport vehicle to transport a plurality of delivery robots to a first robot drop location. The robots are released at the first robot drop location and travel to assigned, respective delivery locations, which are in the vicinity of the first robot drop location. After completing delivery, each of the robots may proceed to a first robot pick-up location which may be different from the first drop off location. The robots are collected by a mobile transport vehicle and are transported to a second robot drop off location. While being transported, the robots can be reloaded with items for delivery in the vicinity of the second drop off location. A system may include one or more such mobile transport vehicles and a plurality of such robots, under the control of a server.

30 Claims, 9 Drawing Sheets

(58) Field of Classification Search
CPC ........... G06Q 10/0832; G06Q 30/0635; G06Q 10/08355; G06Q 30/0202; G06Q 30/0643; G06Q 50/26; G06Q 90/00; G06Q 10/02; G06Q 10/04; G06Q 10/063; G06Q 10/06313; G06Q 10/08345; G06Q 10/0836; G06Q 10/0838; G06Q 10/10; G06Q 10/1093; G06Q 20/403; G06Q 30/018; G06Q 30/0205; G06Q 30/06; G06Q 30/0603; G06Q 30/0623; G06Q 30/0633; G06Q 30/0639; G06Q 30/0641; G06Q 50/01; G06Q 50/02; G06Q 50/18; G06Q 50/32

See application file for complete search history.

(56) References Cited

U.S. PATENT DOCUMENTS

| | | | |
|---|---|---|---|
| 5,942,869 | A | 8/1999 | Katou et al. |
| 6,467,293 | B1 | 10/2002 | Goosman |
| 6,602,037 | B2 | 8/2003 | Winkler |
| 7,073,634 | B2 | 7/2006 | Mitchell et al. |
| 7,894,939 | B2 | 2/2011 | Zini et al. |
| 7,931,431 | B2 | 4/2011 | Benedict et al. |
| 8,485,285 | B2 | 7/2013 | Ferrigni |
| 8,948,914 | B2 | 2/2015 | Zini et al. |
| 9,020,632 | B2 | 4/2015 | Naylor |
| 9,031,692 | B2 | 5/2015 | Zhu |
| 9,244,147 | B1 | 1/2016 | Soundararajan et al. |
| 9,256,852 | B1 | 2/2016 | Myllymaki |
| 9,266,675 | B2 | 2/2016 | Yamashita |
| 9,373,149 | B2 | 6/2016 | Abhyanker |
| 9,557,740 | B2 | 1/2017 | Crawley |
| 9,561,941 | B1 | 2/2017 | Watts |
| 9,630,619 | B1 | 4/2017 | Kentley et al. |
| 9,682,481 | B2 | 6/2017 | Lutz et al. |
| 9,694,976 | B1 | 7/2017 | Wurman et al. |
| 9,791,557 | B1 | 10/2017 | Wyrwas et al. |
| 9,844,879 | B1 | 12/2017 | Cousins et al. |
| 2003/0165373 | A1 | 9/2003 | Felder et al. |
| 2006/0237239 | A1 | 10/2006 | Bruner et al. |
| 2012/0090110 | A1 | 4/2012 | Van Den Berg et al. |
| 2013/0110281 | A1 | 5/2013 | Jones et al. |
| 2013/0332021 | A1 | 12/2013 | Goren |
| 2014/0081445 | A1 | 3/2014 | Villamar |
| 2014/0136414 | A1 | 5/2014 | Abhyanker |
| 2014/0254896 | A1 | 9/2014 | Zhou et al. |
| 2014/0365258 | A1 | 12/2014 | Vestal et al. |
| 2015/0006005 | A1 | 1/2015 | Yu et al. |
| 2015/0045945 | A1 | 2/2015 | Zini et al. |
| 2015/0100152 | A1 | 4/2015 | Barragán Treviño et al. |
| 2015/0183581 | A1 | 7/2015 | Worsley |
| 2015/0379468 | A1 | 12/2015 | Harvey |
| 2016/0107750 | A1* | 4/2016 | Yates ............... B64C 39/024 244/2 |
| 2016/0185466 | A1* | 6/2016 | Dreano, Jr. ........ G06Q 30/0635 705/26.81 |
| 2016/0207710 | A1 | 7/2016 | Conrad et al. |
| 2016/0280236 | A1* | 9/2016 | Otsuka ................ B60W 10/20 |
| 2016/0325928 | A1 | 11/2016 | Lepek |
| 2016/0334230 | A1* | 11/2016 | Ross ................ G01C 21/3415 |
| 2016/0355337 | A1 | 12/2016 | Lert et al. |
| 2016/0368464 | A1 | 12/2016 | Hassounah |
| 2017/0017237 | A1 | 1/2017 | Tokuyama et al. |
| 2017/0020087 | A1* | 1/2017 | Younis ................ A01G 25/09 |
| 2017/0100837 | A1 | 4/2017 | Zevenbergen et al. |
| 2017/0160735 | A1* | 6/2017 | Mikan ................ B64C 39/024 |
| 2017/0185853 | A1 | 6/2017 | Yokota et al. |
| 2017/0220981 | A1 | 8/2017 | Shucker et al. |
| 2017/0267452 | A1 | 9/2017 | Goren et al. |
| 2017/0364074 | A1 | 12/2017 | Lau et al. |
| 2017/0368684 | A1 | 12/2017 | Zevenbergen et al. |
| 2018/0005169 | A1 | 1/2018 | High et al. |
| 2018/0020896 | A1 | 1/2018 | High et al. |
| 2018/0024554 | A1 | 1/2018 | Brady et al. |
| 2018/0079626 | A1 | 3/2018 | Brady et al. |

OTHER PUBLICATIONS

Qatar: MOTC, QPost sign MOU to develop an autonomous drone delivery service. (2016). MENA Report, , n/a. Retrieved from https://dialog.proquest.com/professional/docview/1780371078?accountid=131444 (Year: 2016).*

Anonymous, "Lieferroboter Starship: 'Klauen würde ich ihn nicht'—Auto—Tagesspiegel," Nov. 29, 2015, retrieved from the Internet, URL: http://www.tagesspiegel.de/mobil/lieferroboter-starship-klauen-wuerde-ich-ihn-nicht/12647114.html.

Baker, "Automated Street Crossing for Assistive Robots," Proceedings of the 2005 IEEE, Jun. 28-Jul. 1, 2005.

Pettitt, Jeniece, "Forget delivery drones, meet your new delivery robot," Nov. 2, 2015, retrieved from the Internet, URL: https://www.cnbc.com/2015/11/02/forget-delivery-drones-meet-your-new-delivery-robot.html.

International Search Report dated Aug. 8, 2017, issued in PCT counterpart application (No. PCT/EP2017/064019).

Written Opinion dated Aug. 8, 2017, issued in PCT counterpart application (No. PCT/EP2017/064019).

* cited by examiner

METHOD AND SYSTEM FOR DELIVERING ITEMS

RELATED APPLICATIONS

This is a Bypass Continuation of International Application No. PCT/EP2017/064019 filed Jun. 8, 2017, which claims priority to European Patent Application No. EP 16175135.9, filed Jun. 17, 2016 and also claims priority to European Patent Application No. EP 16186907.8, filed Sep. 1, 2016. The contents of the aforementioned applications are incorporated by reference in their entirety.

FIELD

The present invention generally relates to the field of delivering items to addressees. More particularly, the present invention relates to methods and a system to deliver items to addressees.

INTRODUCTION

During recent years, goods are increasingly purchased remotely, e.g., ordered online. Such goods are delivered to the addressee. Typically, the items or goods, e.g., a parcel containing a book or any other parcel, is transported to the addressee including the following steps: First, the book is packed at a packing location into a car or relatively small truck. The truck brings the book to a packing station or a package center, where the book may be loaded into another truck typically travelling the main distance between the initial packing location and the location of the addressee and arriving at another or second package center, which package center is relatively close to the location of the addressee (this step may also be performed by a ship or a plane). Here, the book may be packed into a van, car or relatively small truck to deliver the item to the addressee. This van may then go to the addressee and the person driving the car may deliver the book to the addressee—the delivering person may either ring the doorbell of the addressee and hand the book over to the addressee or put the book in a post box of the addressee. The book may also be left with the neighbors, or may be brought to a nearby convenient pick-up location. The person skilled in the art will understand that the described book is simply exemplary and any other good, also including letters and edible goods, such as pizzas, may also be used. While the above described delivery of goods may be satisfactory in some instances, it has certain drawbacks and limitations. First, it requires humans to perform a substantial amount of the delivery—people drive the vehicles and hand over the goods and/or put the goods into a post box, leave it with a neighbor or bring it to a nearby convenient pick-up location. This may be disadvantageous for a plurality of reasons: Humans are prone to failure. That is, it is possible that the wrong goods are delivered to the addressee. Further, the task of delivering the goods is a relatively simple task, potentially demotivating the person performing it. Moreover, having people perform such simple tasks may be relatively expensive when compared to automated delivery. That is, the usage of the resources may be far from optimal. Further still, the need for the delivery of goods may fluctuate during the course of the day or seasonally. For example, the ordering of, e.g., pizza, is thought to be highest during the evening and the ordering of, e.g., books is highest in the weeks and days before Christmas. People may also fall ill, which may be a further disadvantage of having people performing the tasks of delivering the goods.

For all these reasons, automation of the delivery process (or parts thereof) is generally desirable. Several attempts have been made to automate parts of the delivery process and particularly the "last mile" delivery directly preceding the goods being provided to the addressee (as this part is particularly labor intensive). For example, U.S. Pat. No. 9,256,852 B1 discloses an autonomous box truck carrying a package securing subsystem having securable compartments. The compartments include access subsystems. The box truck may go to the address of the addressee and the addressee may be informed about the arrival time of the box truck. The addressee may further be provided with an access code, e.g., a PIN. Once the box truck has arrived at the addressee's address, the addressee may enter the access code into the access subsystem and a compartment storing the addressee's goods may then be accessed.

While the technology disclosed in U.S. Pat. No. 9,256,852 B1 may be advantageous, as it does not require a person driving the truck and delivering the goods, it is still far from optimal.

In light of the above, it is an object of the present invention to overcome or at least alleviate the shortcomings and disadvantages of the prior art. In particular, it is an object of the present invention to provide a method and a system further optimizing and reducing the usage of time and resources for the delivery of goods, particularly in the parts of the delivery directly preceding the goods being handed over to the addressee.

SUMMARY

In a first embodiment, a method for delivering a plurality of items to a plurality of delivery locations is provided. The method comprises a transport set comprising at least one mobile transport apparatus comprising a first mobile transport apparatus, the first mobile transport apparatus transporting a plurality of robots. The method also comprises the first mobile transport apparatus travelling to a first robot drop location. The method further comprises a first robot set, which first robot set comprises at least one robot being released from the first mobile transport apparatus at the first robot drop location. The method also comprises each of the at least one robot of the first robot set travelling from the first robot drop location to a delivery location. The method also comprises each of the at least one robot of the first robot set delivering an item of a first item set at the respective delivery location. The method further comprises each of the at least one robot of the first robot set travelling to a robot pick-up location. The method further comprises each of the at least one robot of the first robot set being collected into a mobile transport apparatus at the respective robot pick-up location.

In a second embodiment, an alternative method for delivering a plurality of items to a plurality of delivery locations is provided. In the method, a transport set comprising at least one mobile transport apparatus comprises a first mobile transport apparatus, the first mobile transport apparatus transporting items. The first mobile transport apparatus travels to a first robot loading location. A first robot set, which first robot set comprises at least one robot, travels to the first robot loading location. The at least one robot of the first robot set is loaded with at least one item of a first item set at the first robot loading location. Each of the at least one robot of the first robot set travels from the first robot loading location to a delivery location, respectively. Each of the at least one robot of the first robot set delivers an item of the first item set at the respective delivery location. Each of the at least one robot of the first robot set leaves the respective delivery location. In other words, the robots meet the transport apparatus at a robot loading location, where they are loaded with items. They then "swarm out" from the loading location to deliver the items at respective delivery locations and leave the respective delivery locations. Such a method may have the advantage that the robots do not need to be transported by the mobile transport apparatus.

In a third embodiment, a system for delivering a plurality of items to a plurality of delivery locations is disclosed. The system comprises a plurality of robots, each adapted to deliver an item at a respective delivery location. The system also comprises a transport set comprising at least one mobile transport apparatus adapted to transport the plurality of robots and/or load items into the plurality of robots.

In some embodiments, the transport set can comprise at least one mobile transport apparatus, which at least one mobile transport apparatus can comprise a first mobile transport apparatus. That is, the present technology may be employed with a single mobile transport apparatus or with a plurality of mobile transport apparatuses, such as 2, 3 or more mobile transport apparatuses.

In some embodiments, the first item set can be the set of items delivered by the first robot groups. That is, this item set may comprise one or more items.

In some embodiments of the first embodiment, the robot pick-up location may be the same or different for different robots.

In some embodiments, the first robot set can comprise at least two robots. The first robot set can comprise a plurality of robots, such as 2, 3, 4, 5, 6, 7, 8 or more robots.

In the first embodiment, dropping off a plurality of robots at a drop off location can be advantageous, as they can take different paths and deliver several items in the same delivery area simultaneously, coming to the pick-up location by different paths, or potentially coming to different pick-up locations.

In some embodiments, the items being delivered by the at least one robot can comprise parcels. The items can also comprise letters, packages, groceries, food or drinks, takeout and/or other forms of deliveries.

In some embodiments, each of the at least one mobile transport apparatus can comprise a truck, a van and/or a cargo platform that can comprise a fence. The mobile transport apparatus can comprise a cargo volume in the range of 5 to 30 m$^3$, preferably 10 to 25 m$^3$, further preferably 15 to 20 m$^3$, such as 17 m$^3$. Such a volume can be advantageous for optimizing the number of robots and/or deliveries that can fit inside. Such a volume can also be preferable so that the mobile transport apparatus can drive on smaller streets and have a high turnout of deliveries.

In some embodiments, each of the at least one mobile transport apparatuses can be an autonomously or semi-autonomously driving vehicle. Such a vehicle would be advantageous, as it would reduce the need for human drivers waiting for the robots at the pick-up location. A fully autonomous vehicle could drive autonomously for the whole time of its operation. A semi-autonomous vehicle could drive autonomously for at least 50% of its operation time.

In some embodiments of the first embodiment, the step of the first robot set being released from the first mobile transport apparatus at the first robot drop location includes the at least one robot of the first robot set driving out of the first mobile transport apparatus. This can, for example, be realized as the at least one first mobile transport apparatus having a ramp, slope, inclination, and/or access hatch that is adapted to descend automatically upon reaching a drop location. Such a ramp could also be adapted to descend automatically upon reaching a pick-up location. Alternatively, such a ramp could be adapted to descend upon detecting a robot approaching said ramp from the inside and/or from the outside of the mobile transport apparatus.

In some embodiments of the first embodiment, the step of the first robot set being released from the first mobile transport apparatus at the first robot drop location can include the at least one robot of the first robot set being lifted out of the first mobile transport apparatus. This can, for example, be realized as the at least one mobile transport apparatus comprising a lifting device adapted to at least transfer the robot vertically and horizontally such that the robot is transferred from the first mobile transport apparatus to the outside and/or from the outside to the first mobile transport apparatus. Such a lifting device can comprise a lift for lifting the robots out of and/or into the mobile transport apparatus.

In such embodiments of the first embodiment, the lifting device can be adapted to activate upon reaching the robot drop location and/or the robot pick-up location. It can also be adapted to detect the robot approaching, for example from outside the mobile transport apparatus, and activate when the robot reaches a certain predetermined distance from the mobile transport apparatus.

In some embodiments of the first embodiment, the first robot drop location can be identical to the robot pick-up location for at least one robot of the first robot set. This can mean, for example, that the robot can set out from its drop location, arrive at the delivery location, perform the delivery, and return to the drop location for its pick-up. This can be advantageous if the mobile transport apparatus arrives at some drop location, releases a plurality of the robots and waits for them at the same location. The energy usage of the mobile transport apparatus can be optimized.

Furthermore, if the plurality of the robots travels to different delivery locations from the drop location, it can be advantageous for them to return to the same drop location for pick-up, as the drop location could have been preselected to optimize the total time needed for the robots to travel to the different delivery locations, make the delivery and come back.

In some embodiments of the first embodiment, the first robot drop location can be non-identical to the robot pick-up location for at least one robot of the first robot set. This can be implemented as a first robot being dropped off at the drop location, travelling to the delivery location and then travelling to a pick-up location different from the drop location. This can be particularly advantageous when optimizing the total time of operation of a plurality of robots. For example, the mobile transport apparatus could travel to a first drop location, release at least one first robot, then travel to a second drop location and release at least one second robot. The mobile transport apparatus could then travel to a first pick-up location, different from the first drop location, and pick-up the first robot. It could then travel to a second pick-up location, either the same as the second drop location or different and pick-up the second robot. The advantage would be in the time gained by adjusting the drop and pick-up location by taking into consideration that the robots must also travel to their respective delivery locations. The total time travelled by both the mobile transport apparatus and the robots could then be optimized by changing the drop and pick-up locations.

In some preferred embodiments of the first embodiment, the method can further comprise the first mobile transport apparatus travelling from the first robot drop location to a second robot drop location after the step of the first robot set being released from the first mobile transport apparatus at the first robot drop location. In such embodiments, the second robot drop location could be identical to the robot pick-up location for at least one robot of the first robot set. In such preferred embodiments, the method can further comprise a second robot set comprising at least one robot being released from the first mobile transport apparatus at the second robot drop location. The method can further comprise each of the at least one robot of the second robot set travelling from the second robot drop location to a delivery location. The method can also comprise each of the at least one robot of the second robot set delivering an item of a second item set at the respective delivery location. The method can also comprise each of the at least one robot of the second robot set travelling to a robot pick-up location. The method can also comprise each of the at least one robot of the second robot set being collected in to a mobile transport apparatus at the respective robot pick-up location. In such embodiments, the second robot set could comprise at least two robots. In such embodiments, the second robot drop location could be identical to the robot pick-up location for at least one robot of the second robot set. In such embodiments, the second robot drop location could also be non-identical to the robot pick-up location for at least one robot of the second robot set.

In some embodiments of the first embodiment, the transport set could comprise a second mobile transport apparatus. In such embodiments, the step of each of the at least one robot of the first robot set being collected by a mobile transport apparatus at the respective robot pick-up location could comprise at least one robot of the first robot set being collected into the second mobile transport apparatus. This step could be preceded by the second mobile transport apparatus travelling to the respective robot pick-up location. In such embodiments, the method could further comprise the second mobile transport apparatus transporting a plurality of robots and the second mobile transport apparatus travelling to a robot drop location. The method could also comprise a set of the robots of the second mobile transport apparatus being released from the second mobile transport apparatus at the robot drop location, wherein the set of the robots of the second mobile transport apparatus comprises at least one robot. The method could also comprise each of the at least one robot of the set of the robots of the second mobile transport apparatus travelling from the robot drop location to a delivery location. The method could further comprise each of the at least one robot of the set of the robots of the second mobile transport apparatus delivering an item at the respective delivery location. The method could also comprise each of the at least one robot of the set of the robots of the second mobile transport apparatus travelling to a robot pick-up location. The method could further comprise each of the at least one robot of the set of the robots of the second mobile transport apparatus being collected into a mobile transport apparatus at the respective robot pick-up location. In such embodiments, the set of the robots of the second mobile transport apparatus could comprise at least two robots. Preferably it could comprise a plurality of robots, such as 2, 3, 4, 5, 6, 7, 8 or more robots.

In some preferred embodiments of the first embodiment, the method further comprises loading at least one item into a robot. Such loading can be performed within a mobile transport apparatus. In some preferred embodiments, said loading can be performed autonomously. In other words, said loading can be performed without a human being present in the cargo area of the transport apparatus. In some embodiments, said loading can be performed while the respective mobile transport apparatus travels from the first robot drop location to the second drop location.

Preferably, said loading can be performed with a robot of the first robot set after said robot has delivered the respective item of the first item set, has travelled to the respective robot pick-up location and has been collected into the first mobile transport apparatus at the respective robot pick-up location. This can be used in practice as follows. The robot can be dropped off at the drop location, and proceed to deliver its one or more items at the one or more delivery locations.

The robot can then be picked up at the pick-up location. Then, the robot can be loaded with new items to be delivered and let off at a second drop location. The loading can be performed on the way from the pick-up location to the second drop location to optimize the overall operation time. In such embodiments, the mobile transport apparatus can comprise both robots and items not placed in robots. Those items could be loaded into robots during operating time. In such embodiments, the mobile transport apparatus can comprise a loading apparatus adapted to load the items into the robots, which loading apparatus can be located inside one of the at least one of the mobile transport apparatuses. In some embodiments, such a loading apparatus can be a robotic and/or automatic loading mechanism.

In some embodiments of the first embodiment, the robot drop locations and the robot pick-up locations are preselected. This can mean that before the mobile transport apparatus sets out, all of the locations where it will stop are known. Those locations can either be updated before each run of the mobile transport apparatus, depending on the exact delivery addresses, or be standard locations convenient for stopping and dropping/picking up the robots.

In some preferred embodiments the system for delivering a plurality of items to a plurality of delivery locations can comprise a server. Said server, the plurality of robots and the at least one mobile transport apparatus can be configured for communication between the server and the plurality of robots, and between the server and the at least one mobile transport apparatus. That is, the mobile transport apparatus and the robots can transmit information/data to a server and receive information/data from the server. In such embodiments, the server can calculate and adjust the travel routes for the at least one mobile transport apparatus and the robots. In such embodiments, the travel routes can be preferably constantly updated. That means that the server can be checking up to date traffic and/or roads information and rerouting the mobile transport apparatus and/or the robots as needed. The server could also update drop and pick-up locations as needed, before or during the start of operation of the mobile transport apparatus.

In some embodiments, the robots can be autonomously or semi-autonomously driving robots. That is, the robots can be adapted to drive fully autonomously during their operation time. The robots could also be adapted to drive autonomously during at least 50% of their operation time.

In practice, the robots can be adapted to drive autonomously unless faced with a difficult situation. Such a situation could comprise, for example, crossing a busy street, interacting with pedestrians, bikers, drivers and/or other humans. In such situations, the robots can be adapted to be controlled by a remote operator. The robots can further comprise speakers and a microphone, so that the remote operator can interact with humans.

In some embodiments, the robot can have a width in the range of 20 to 100 cm, preferably 40 to 70 cm, such as about 55 cm. The robot can have a height in the range of 20 to 100 cm, preferably 40 to 70 cm, such as about 60 cm. The robot can have a length in the range of 30 to 120 cm, preferably 50 to 80 cm, such as about 65 cm. The robot can have a weight in the range of 2 to 50 kg, preferably 5 to 40 kg, more preferably 7 to 25 kg, such as 10 to 20 kg. In embodiments where the robot is a delivery robot, the total weight of the robot comprising the deliveries can be about 10-25 kg.

In some embodiments, the robots can be land-based robots. That is, the robots can be adapted to traverse ground such as sidewalks, lawns, streets, routes, paths, packed ground, grass, snow and/or dirt, but not to traverse water (except for puddles) and/or air.

In some embodiments, the robots can be adapted not to travel with a speed exceeding 10 km/h, preferably 8 km/h, more preferably 6 km/h. This can be advantageous, as the robots do not present danger to pedestrians this way. A robot weighting about 20 kg travelling with a speed of 6 km/h is not likely to injure a pedestrian, or a biker even if an impact occurs. As the robots can preferably be adapted to travel on pedestrian walkways, maintaining pedestrian speed is preferred.

In some preferred embodiments, the robots can be adapted to assume an open and a closed configuration. The open configuration can allow access to a compartment within the robot. The closed configuration would not allow access to the compartment. In such embodiments, the step of each of the at least one robot delivering an item at the respective delivery location can include the respective robot changing from the closed configuration to the open configuration. That is, when the robot arrives at the delivery location, it can be adapted to switch to an open configuration so that the delivery recipient can access the delivery. In some embodiments, the delivery recipient must perform a certain action before the robot would switch to an open configuration, for example, entering an "open" command on a personal communication device such as a smartphone, a smartwatch, and/or other wearable or otherwise computing device. In some embodiments, the robots can each comprise an electronic lock that is locked in the closed configuration and unlocked in the open configuration. Such a lock could for example be unlocked directly from an app on a personal computing device.

In some embodiment of the second embodiment, the method further comprises at least one robot of the first robot set travelling to a second robot loading location after delivering the item of the first item set at the respective delivery location. That is, one or some of the robots may be used for multiple deliveries.

In such an embodiment, the method may further comprise the at least one robot being loaded with at least one item of a second item set at the second robot loading location, each of the at least one robot travelling from the second loading location to a delivery location, respectively, each of the at least one robot delivering an item of the second item set at the respective delivery location, and each of the at least one robot of the first robot set leaving the respective delivery location.

In such an embodiment, the second robot loading location may be identical to the first robot loading location. That is, robots may deliver items and return to the first robot loading location to be loaded a second time at this location. Alternatively, when the second robot loading location is not identical to the first robot loading location, the first mobile transport apparatus may travel from the first robot loading location to the second robot loading location, after the at least one robot of the first robot set is loaded with at least one item of the first item set at the first robot loading location.

In such an embodiment, the method may comprise the step of a second robot set, which second robot set comprises at least one robot, travelling to the second robot loading location. The at least one robot of the second robot set may be loaded with at least one item of an item set at the second robot loading location, each of the at least one robot of the second robot set may travel from the second robot loading location to a delivery location, respectively, each of the at least one robot of the second robot set may deliver an item of the item set at the respective delivery location, and each of the at least one robot of the first robot set may leave the respective delivery location. The second robot set may comprise at least two robots.

In the second embodiment, the first robot set may travel from a first home base to the first robot loading location. Additionally or alternatively, each of the robots may travel to a respective home base after leaving a delivery location.

In the second embodiment, the step of the at least one robot being loaded with at least one item of a first item set at the first robot loading location may comprise the at least one robot driving into or being lifted into the first mobile transport apparatus and being loaded with at least one item while being in the first mobile transport apparatus.

In the second embodiment, the step of the at least one robot being loaded with at least one item of a first item set at the first robot loading location may be performed autonomously.

In the second embodiment, the transport set may comprise a second mobile transport apparatus transporting items, wherein the method further comprises the second mobile transport apparatus travelling to the second robot loading location.

In the second embodiment, the robot loading location(s) may be pre-selected.

The invention will now be described with reference to exemplary embodiment and with reference to the drawings. It is noted that this description is provided for illustrative purpose only and that it should not be construed to limit the scope of the invention.

DESCRIPTION OF EMBODIMENTS

Figure 1:
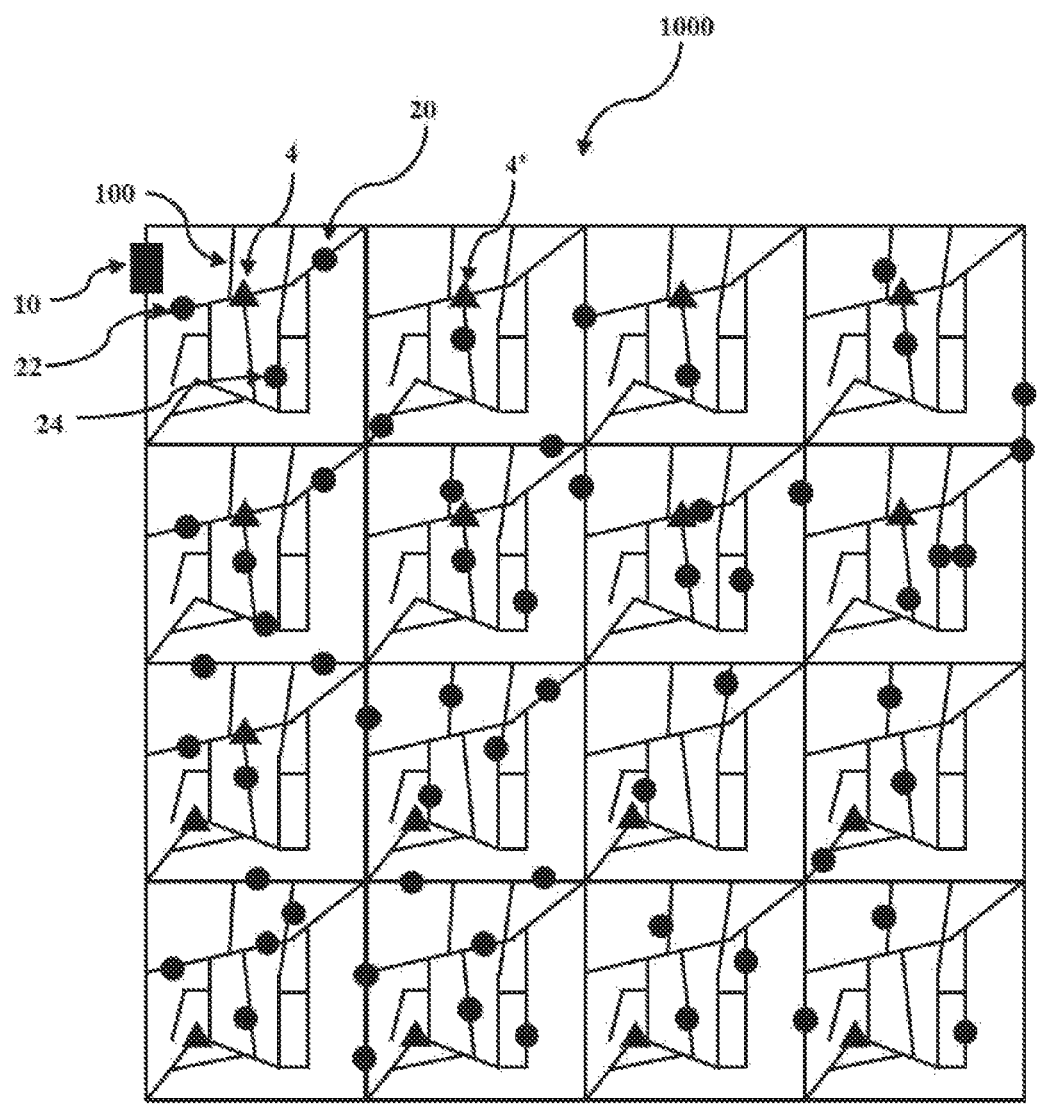
FIG. 1 is a schematic view of a street network and a system in accordance with a first embodiment of the present technology in a first state.

FIG. 1 depicts a network 1000 of streets, which streets are represented by lines 100 (though only one street carries the reference numeral 100 for clarity and simplicity of illustration). In the street network 1000, there are delivery addresses, delivery points or delivery locations 20, 22, 24, generally illustrated by circles. Again, only some of the delivery points carry a reference numeral for ease and clarity of illustration. Furthermore, FIG. 1 also depicts a mobile transport apparatus, that may be a truck or van 10 adapted to load delivery robots, which truck or van is generally depicted as a rectangle, and a plurality of robot drop locations 4. The truck or van 10 may be an autonomously or semi-autonomously driving truck or van. The robot drop locations 4 are generally depicted as triangles and again, only one robot drop location (i.e. one triangle) carries the reference numeral 4 for ease and clarity of illustration. The robot drop locations 4 are locations where the van 10 may stop and release and/or pick-up robots.

Figure 2:
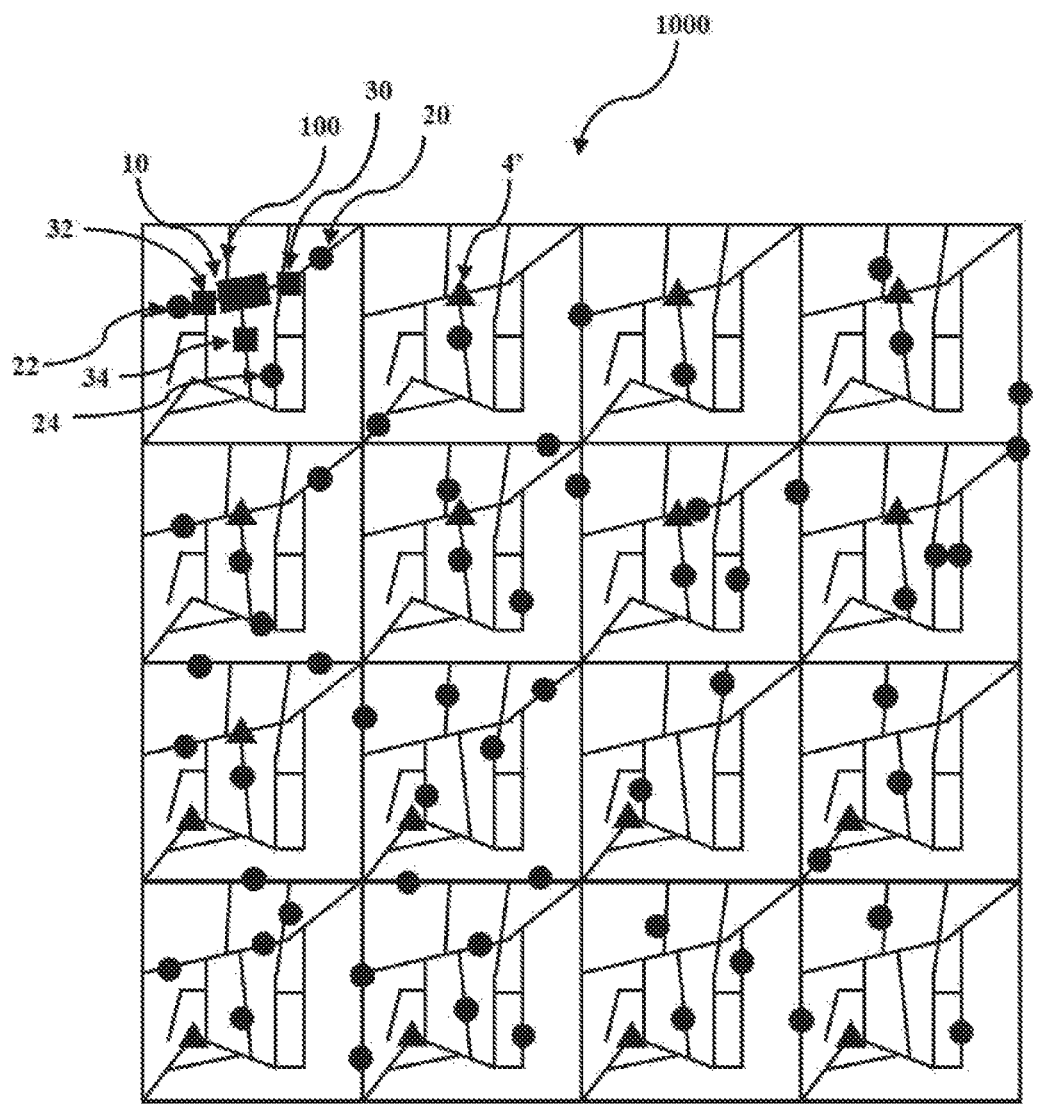
FIG. 2 is a schematic view of a street network and a system in accordance with the first embodiment of the present technology in a second state.

The present technology is directed to the delivery of goods or parcels to different delivery locations 20, 22, 24, generally illustrated by dots. In the depicted embodiment, there are approximately 60 delivery locations 20, 22, 24 located on the street network 1000. While the street network 1000 is depicted to be composed of repetitive structures, those of skill in the art will understand that this is for illustrative purpose only and that other street networks are also envisaged by the present technology. The present technology aims at effectively delivering the goods ("item") to the delivery locations 20, 22, 24, generally depicted as circles. To do so, the van 10 stores a plurality of goods and a plurality of delivery robots 30, 32, 34, whose operation will be described in further detail below. The van 10 travels to a first robot drop location 4 and releases delivery robots 30, 32, 34 at the first robot drop location 4. The item-carrying delivery robots 30, 32, 34 (generally depicted by filled (shaded) squares) then "swarm out", i.e. travel to the respective delivery locations 20, 22, 24 (see FIG. 2), where the delivery robots 30, 32, 34 deliver the goods to respective addressees.

Figure 5:
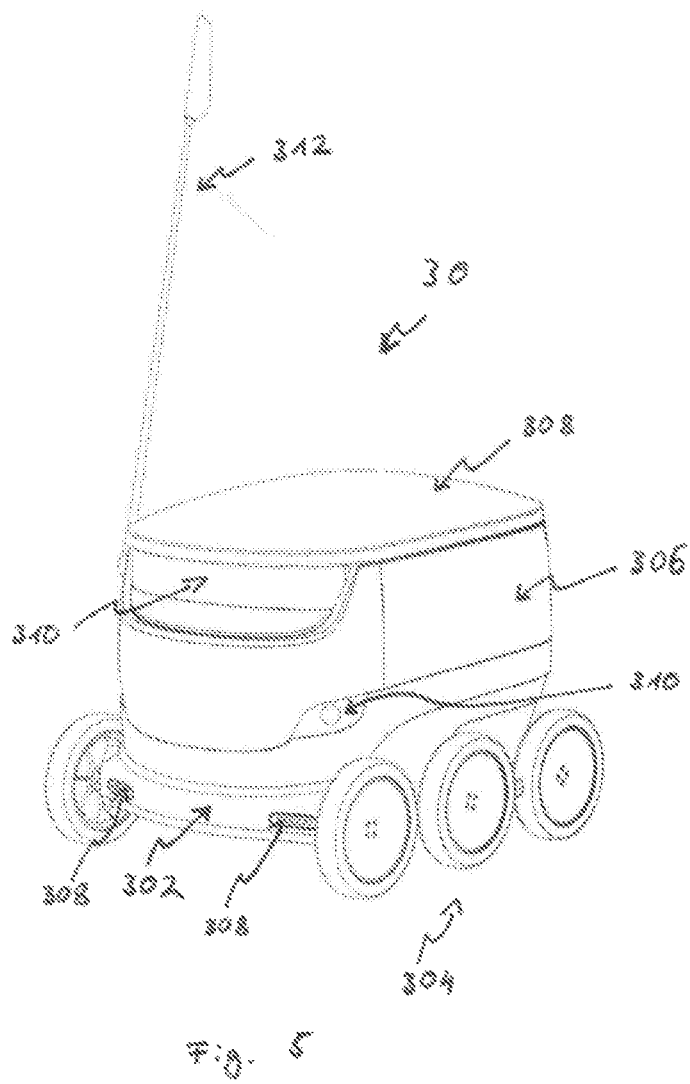
FIG. 5 is a perspective view of a robot to be used in the present technology.

The delivery robots 30, 32, 34 may be autonomous or semi-autonomous robots 30, 32, 34. One exemplary embodiment of a robot 30 is depicted in FIG. 5. The robot 30 may comprise a frame 302 and wheels 304 mounted to the frame 302. In the depicted embodiment there are provided a total of 6 wheels 304. The robot 30 also comprises a body or housing 306 comprising a compartment adapted to house or store the goods to be delivered to the addressee. This compartment may also be called a delivery compartment. The body 306 may be mounted on the frame 302. The robot 30 also typically comprises a lid 308 for closing the body or housing 306. That is, the cover 308 may assume a closed position depicted in FIG. 5 and an open position. In the closed position, there is no access to the goods in the delivery compartment of the body 306.

In the open position of the cover 308 (not depicted), the addressee may reach into a delivery compartment of the body 306 and obtain the goods from the inside of the body 306. The robot 30 may switch from the closed position to the open position in response to the addressee performing an opening procedure, such as the addressee entering a code or the addressee otherwise indicating that he/she is in a position to obtain the goods from the robot 30. For example, the addressee may access the delivery compartment by using an smartphone application or the lid 308 may be automatically opened once the respective delivery location 20, 22, 24 is reached by the respective robot. The robot 30 may also comprise one or a plurality of sensors 310, e.g., cameras, to obtain information about the surroundings of the robot 30. The robot 30 may also comprise lights 308, such as LEDs. Furthermore, in the depicted embodiment, the robot 30 includes an antenna 312, which may extend upwards. Typical dimensions of the robot 30 may be as follows. Width: 20 to 100 cm, preferably 40 to 70 cm, such as about 55 cm. Height (excluding the antenna): 20 to 100 cm, preferably 40 to 70 cm, such as about 60 cm. Length: 30 to 120 cm, preferably 50 to 80 cm, such as about 65 cm. The weight of the robot 30 may be in the range of 2 to 50 kg, preferably in 5 to 40 kg, more preferably 7 to 25 kg, such as 10 to 20 kg. The antenna 312 may extend to an overall height of between 100 and 250 cm, preferably between 110 and 200 cm, such as between 120 and 170 cm. Such a height may be particularly advantageous such that the antenna 312 and thus the overall robot 30 is easily seen by other traffic participants.

Figure 3:
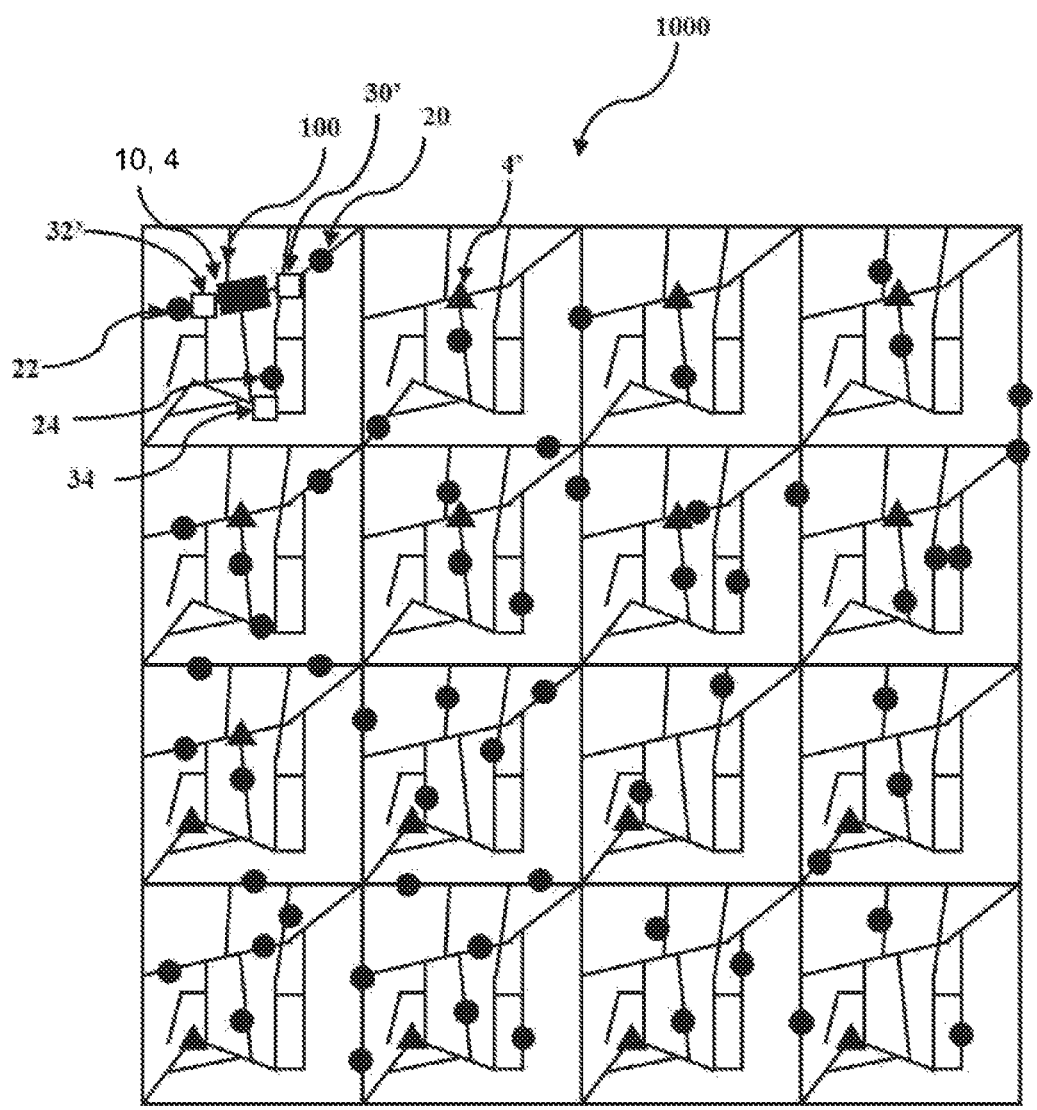
FIG. 3 is a schematic view of a street network and a system in accordance with the first embodiment of the present technology in a third state.

After the delivery robots 30, 32, 34 have delivered the goods to the respective addressees at the delivery locations 20, 22, 24, they travel back to the van 10. This is depicted in FIG. 3, where the empty delivery robots 30', 32', 34' have delivered the goods to the addressees (and are depicted as unfilled (unshaded) squares to indicate that the robots 30', 32', 34' are "empty") and are on their way back to the van 10. In FIG. 3, the van 10 is still located at the first robot drop location 4 (see FIG. 1) and awaits the return of the delivery robots 30', 32', 34' before travelling further. It is understood that each robot drop location can also serve as a robot pick-up location. However, it is noted that the van 10 waiting at the first robot drop location 4 for the returning robots is not a necessity. Furthermore, in case a delivery robot 30, 32, 34 is not able to deliver the goods to the intended addressee (e.g., as the addressee is not present at the delivery address), it is also possible that the respective delivery robot 30, 32, 34 travels back to the van 10 without the goods being delivered.

Figure 4:
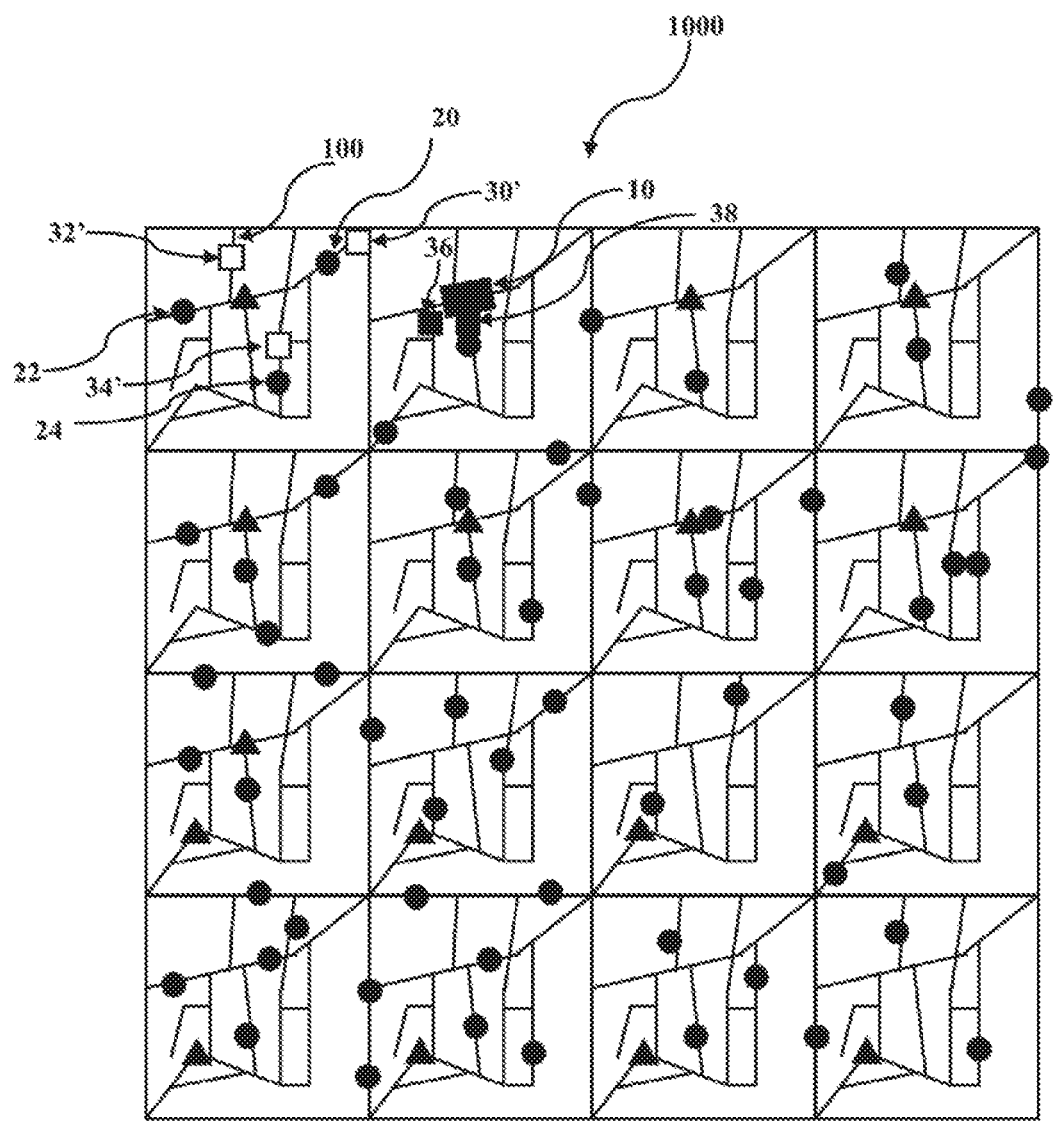
FIG. 4 is a schematic view of a street network and a system in accordance with the first embodiment of the present technology in a fourth state.

To the contrary and as depicted in FIG. 4, it is also possible that after dropping off the delivery robots 30, 32, 34 at the first robot drop location 4, the van 10 travels to another or second robot drop location 4' different from the first robot drop location 4, and releases, i.e. drops off, additional robots 36, 38 travelling to still further delivery locations and awaits the return of empty delivery robots 30', 32', 34' at the second robot drop location 4'. It is also possible that only some of the robots 30, 32, 34, e.g., the robots 30, 32, are picked up at the second robot drop location 4'. Other robots, e.g., the robot 34, are only picked up at another robot drop location, such as a robot drop location to which the van 10 travels later. Furthermore, it is also possible that some of the robots 30, 32, 34 are not picked up by the van 10, but that such robots 30, 32, 34 travel back to a immobile robot station, e.g., a hub.

Such procedures may then be repeated. That is, the van 10 may travel to a plurality of other robot drop locations 4 and release and/or load at least one robot 30, 32, 34 at each of the robot drop locations 4. Whenever a delivery robot 30, 32, 34 is released at a robot drop location 4, the robot travels to the respective delivery location 20, 22, 24 where the goods of the respective robot 30, 32, 34 are to be delivered, delivers the goods at the respective delivery location 20, 22, 24 and then travels back to a robot drop location 4, 4' and is loaded again into the van 10. The robot drop location 4, 4' the robot 30, 32, 34 travels to after delivering its goods may be the same robot drop location 4, 4' the robot 30, 32, 34 was released or a different one. The robot drop locations 4, 4' typically are good locations where the van 10 can safely stop and release and/or pick-up the robots 30, 32, 34 and examples for such robot drop locations 4, 4' include parking lots and gas stations, among others.

According to one embodiment, the robots 30, 32, 34 are preloaded with the goods that they deliver at the delivery locations 20, 22, 24. That is, at the beginning of the delivery method, there may be an equal number of items to be delivered and robots 30, 32, 34. During one delivery cycle, every robot 30, 32, 34 is used once to deliver goods to a delivery location and is then returned to the van 10. It is also possible that a robot 30, 32, 34 carries a plurality of items to be delivered to different delivery locations 20, 22, 24 and travels to these different delivery locations 20, 22, 24 before being collected by the van 10. In such an embodiment, the robot 30 may have a plurality of delivery compartments, each being individually accessible.

According to another embodiment, robots 30, 32, 34 may also be reloaded after they have made a delivery. For example, in the depicted embodiment with approximately 60 delivery locations and approximately 60 items to be delivered, there may be provided only 15 robots 30, 32, 34. The goods to be delivered may be stored in the van 10 and may be loaded onto the robots 30, 32, 34 prior to their delivery. In such an embodiment, a robot 30, 32, 34 is loaded with the respective good to be delivered to a first delivery location 20, 22, 24, then returns to the van 10 at a robot drop location 4, 4' and is reloaded with another item to be delivered to another delivery location 20, 22, 24. This reloading typically takes place while the robot is in the van 10.

Hither, the present technology has been described with reference to a single truck or van 10 (that is a single mobile transport apparatus). However, the present technology may also employ a plurality of trucks or vans 10, that is a plurality of mobile transport apparatuses, such as two or more. In such embodiments, the robots 30, 32, 34, 36, 38 may be transported in a first van 10, which robots 30, 32, 34, 36, 38 may be released from the first van 10. The robots 30, 32, 34, 36, 38 may then deliver the items at respective delivery locations 20, 22, 24. Afterwards, the robots 30, 32, 34, 36, 38 may travel back to respective robot pick-up locations 4. Here, some of the robots 30, 32, 34, 36, 38 may be collected from the first van 10, while others of the robots 30, 32, 34, 36, 38 may be collected into another van, which may also be referred to as a second van (not depicted). Robots may also be released from the second van. While the present technology has now been described with reference to a single van and with reference to two vans, it will be understood that it is also possible that more than two vans be employed.

That is, in very simple words, the present technology provides a method for delivering items, such as goods to addressees. To do so, a van 10 is provided, which van 10 stores a plurality of goods and a plurality of delivery robots 30, 32, 34. The van 10 goes to a first robot drop location 10 and releases at least one robot 30, 32, 34. Each of these at least one robots 30, 32, 34 travels to a respective delivery location 20, 22, 24, where the item (or items) carried by the respective robot 30, 32, 34 is delivered. After that, each of the at least one robot 30, 32, 34 travels to a robot drop location 4, 4', which may or may not be the same robot drop location 4, 4', where the at least one robot 30, 32, 34 was released and is collected by the van 10.

That is, instead of the van 10 having to travel to each and every delivery location 20, 22, 24, the van 10 only travels to a more limited number of robot drop locations 4, 4' and releases the robots 30, 32, 34 at such robot drop locations 4, 4', which may be predetermined. This may be advantageous for a plurality of reasons: First, by the van 10 not having to stop at every single delivery location 20, 22, 24, the overall time required to deliver a certain number of packages may be reduced. Second, the van 10 only stopping at a limited number of robot drop locations 4, 4' may also be advantageous for another reason: The robot drop locations 4, 4' may be preselected to only include such locations where the van 10 may stop safely and conveniently.

This may be a difference to the prior approach where the van 10 had to stop at various and potentially also inconvenient and hazardous locations. Further still, it will be appreciated that the overall distance traveled by the van 10 will be reduced. That is, a substantial amount of the distance to be traveled will be traveled by the delivery robots 30, 32, 34 instead of the van 10. As the delivery robots 30, 32, 34 are typically substantially smaller and lighter than the van 10, this may reduce energy consumption. Still further, the present technology is more fail safe than the prior approaches. As stated, in the present technology, the van 10 travels less distance during one delivery cycle and its travel route is also limited to the routes between the robot drop locations 4, 4'. Thus, the likelihood of a breakdown both to technical problems and to crashes may be reduced—both, due to the reduction in distance traveled by the van 10 and due to the van 10 only travelling to predetermined locations. On the other hand, there may be breakdowns or crashes of the individual delivery robots 30, 32, 34. However, having a failure or a breakdown of an individual delivery robot 30, 32, 34 is not as severe as a breakdown or failure of the van 10, as the delivery process may be continued with the other robots 30, 32, 34, even if one of them has broken down (which is not possible if the van 10 breaks down). Thus, the present technology is improved with regard to delivery speed, energy and cost efficiency and fail safety.

Figure 6:
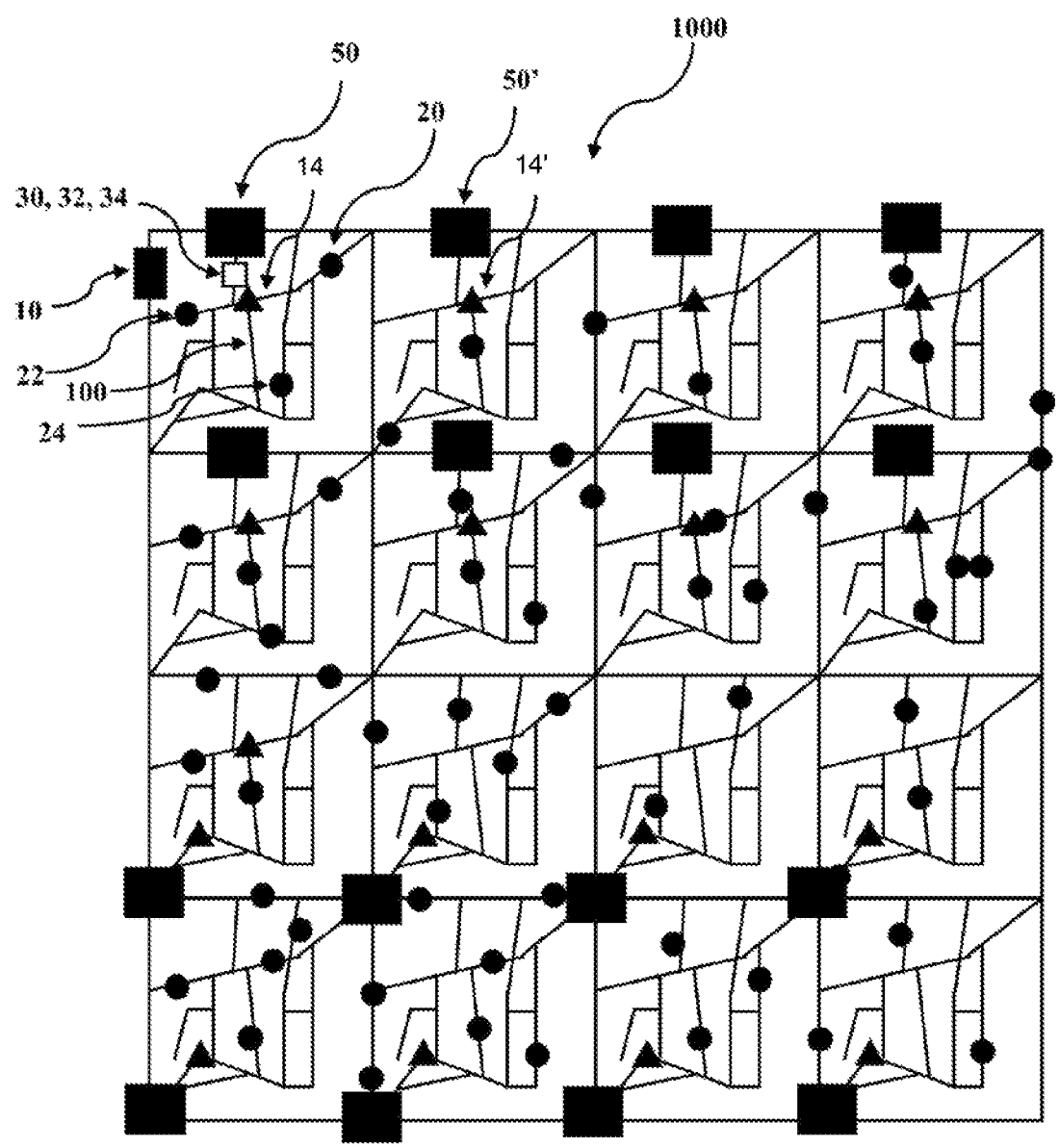
FIG. 6 is a schematic view of a street network and a system in accordance with a second embodiment of the present technology in a first state.
Figure 7:
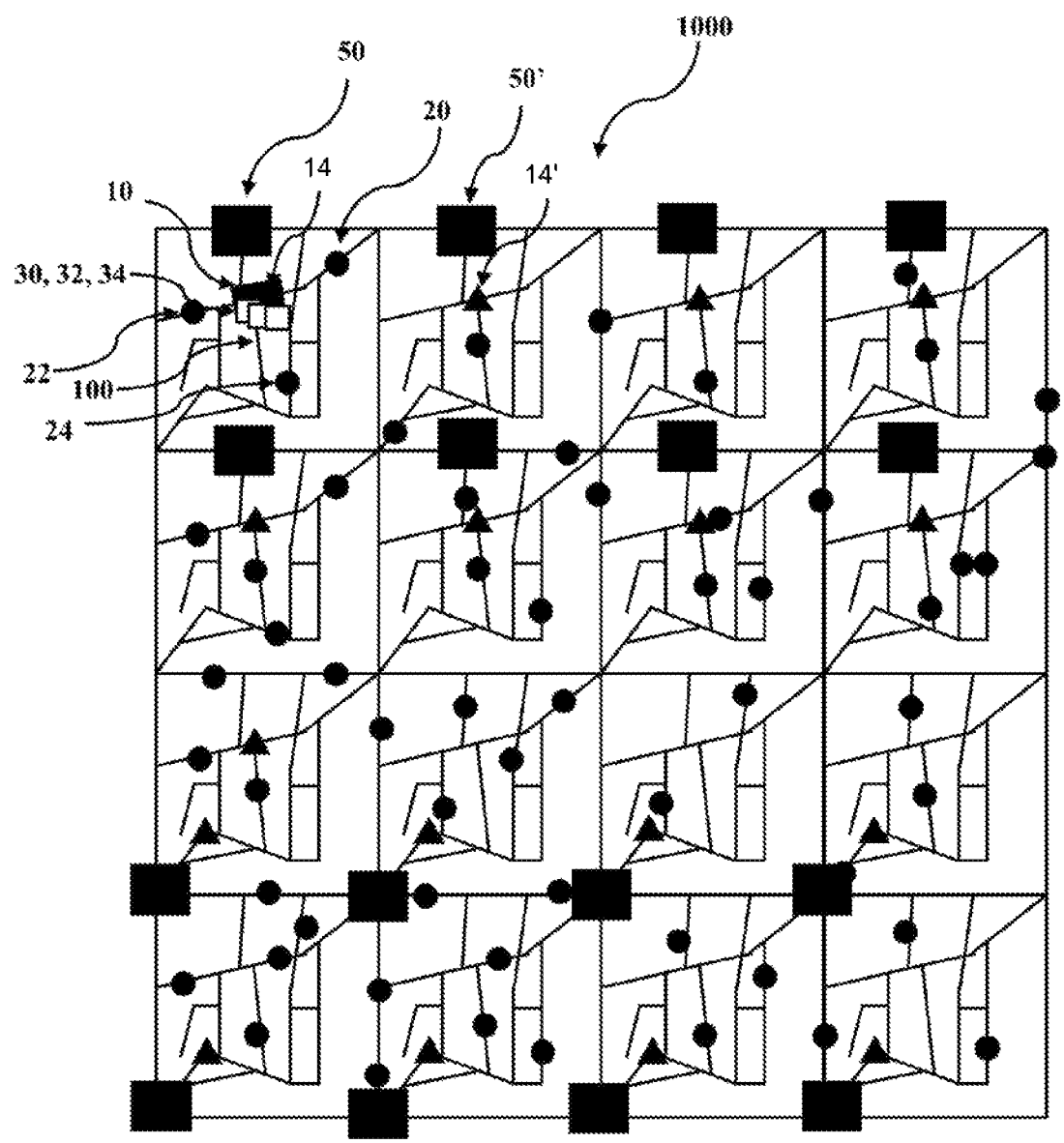
FIG. 7 is a schematic view of a street network and a system in accordance with the second embodiment of the present technology in a second state.
Figure 8:
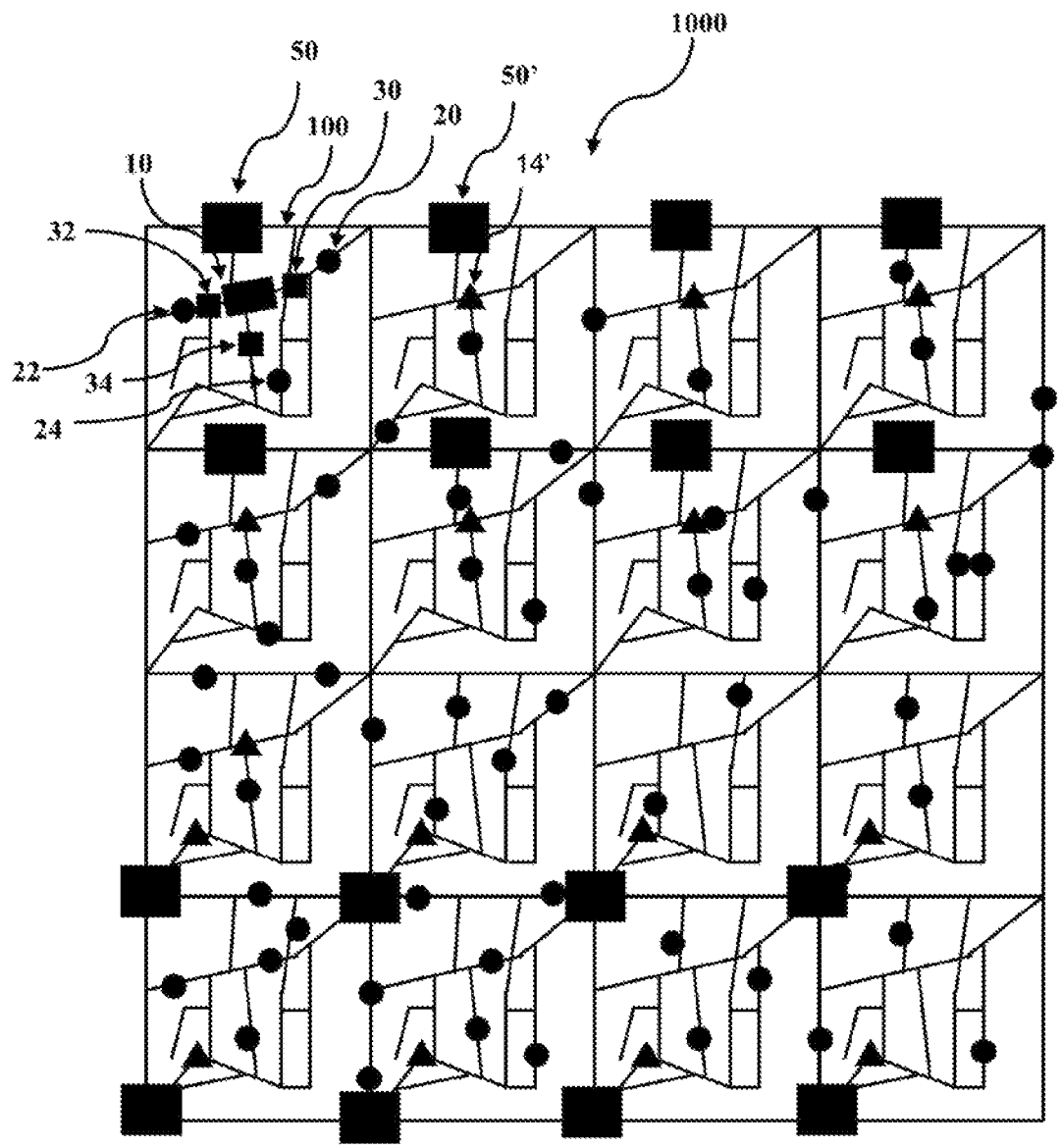
FIG. 8 is a schematic view of a street network and a system in accordance with the second embodiment of the present technology in a third state.

An alternative form of the present technology will now be described with reference to FIGS. 6 to 9. Again, like reference numerals indicate like features. In the embodiment depicted in FIGS. 6 to 9, triangles 14, 14' represent robot loading locations, i.e., locations where robots 30, 32, 34 may be loaded with items, such as parcels and/or deliveries. In the state depicted in FIG. 6, a mobile transport apparatus 10 (which can again be a truck or a van, for example) is on its way to a first robot loading location 14. Furthermore, also the robots 30, 32, 34 are on their way to the loading location 14. More particularly, these robots 30, 32, 34 are on their way from a robot base 50 to robot loading location 14. It is noted that while only one square is depicted in FIG. 6, this square is intended to indicate 3 robots 30, 32, 34. When no delivery is to be made, the robots 30, 32, 34 are in a "rest-position". In such a position, the robots 30, 32, 34 are located in the robot base 50, which may also be referred to as a "home base" or "hub". The robot base 50 may be a relatively simple building, such as a garage, for "storing" the robots 30, 32, 34. The hub, robot base of home base 50 may be a physical location (for example a parking lot), a physical structure (for example a house, a warehouse, a shipping container, a barn, a depot and/or a garage). The hub 50 may serve as a storage, maintenance, repair, recharge and resupply station for the robots 30, 32, 34. One hub 50 can "store" one or more robots. In a preferred embodiment, one hub may house 20-200 robots. Once deliveries are to be made, a suitable number of robots 30, 32, 34 leaves the hub or base 50 and travels to the robot loading location 14. The robots 30, 32, 34 "meet" the mobile transport apparatus 10 at the robot loading location 14 (see FIG. 7). Here, items, i.e., deliveries, such as parcels, are loaded into the robots 30, 32, 34. Typically, at least one item is loaded into each robot 30, 32, 34. However, it is also possible that more than one item is loaded into one or each of the robots 30, 32, 34. Once the items are loaded into the respective robots 30, 32, 34 (which, again, are indicated by the squares representing the robots being filled), the robots 30, 32, 34 may set off to the respective delivery locations 20, 22, 24 (see FIG. 8). When reaching the respective delivery locations 20, 22, 24, they may deliver the respective items (as described above).

Figure 9:
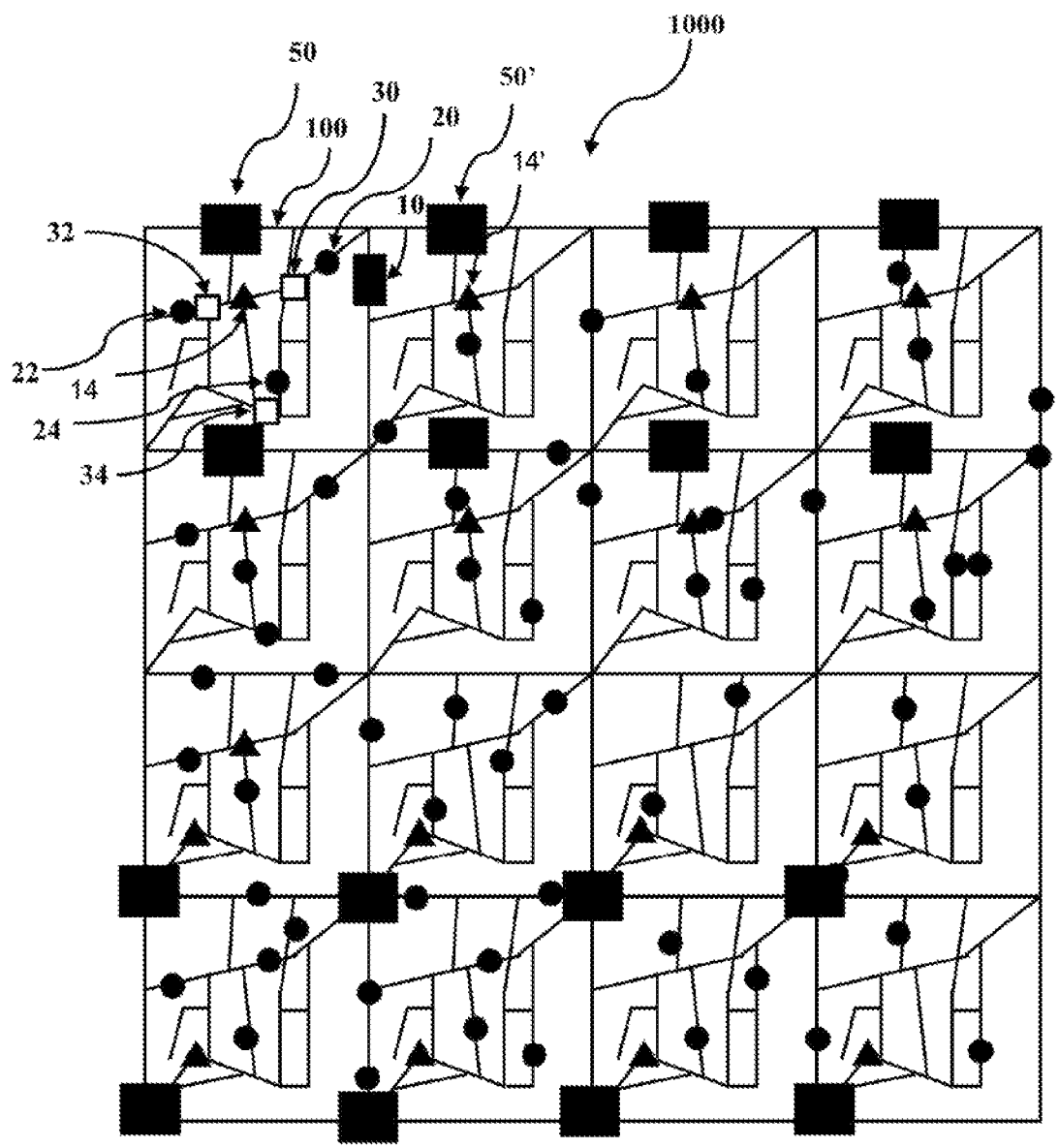
FIG. 9 is a schematic view of a street network and a system in accordance with the second embodiment of the present technology in a fourth state.

After the delivery is made, the robots 30, 32, 34 leave the respective delivery location 20, 22, 24. There are different possibilities where the robots 30, 32, 34 may then travel to. It is possible that there is another item a respective robot 30, 32, 34 can pick-up (or be loaded with) at the respective robot loading location 14. In this case, the respective robot 30, 32, 34 may travel back to the first robot loading location 14 and be loaded here once again. Such a loading may be performed either by the described mobile transport apparatus 10 or by another mobile transport apparatus that has reached the first robot loading location 14 in the meantime. Alternatively, it is also possible that the respective robot 30, 32, 34 travels to another robot loading location 14' different from the first robot loading location and that another item is loaded into the robot 30, 32, 34 at such other (or: second) robot loading location 14'. Furthermore, the respective robot 30, 32, 34 may also travel directly to another delivery location and deliver an item at such other delivery location. As a further alternative, if there is currently no item to be delivered by a robot 30, 32, 34, the robot 30, 32, 34 may also travel back to its robot base 50. This is depicted in FIG. 9. After loading the robots 30, 32, 34 with items, the mobile transport apparatus 10 travels from the first robot loading location 14 to the second robot loading location 14', where it may meet further robots and load items into them (not depicted). The robots 30, 32, 34 deliver the respective items at the respective delivery locations 20, 22, 24. After the respective deliveries, the robots 30, 32, 34 are "empty", that is, they do not carry any items to be delivered, as indicated by the robots 30, 32, 34 being represented by "empty" (unshaded) squares. The robots 30, 32, 34 then travel back to the robot base 50 to await further deliveries to be made. In the embodiment depicted in FIGS. 6 to 9, there is provided one robot base 50, 50' per robot loading location 14, 14'. While this may be one possible configuration, it is noted that other configurations (e.g., one robot base 50 serving more than one robot loading locations 14 or more than one robot base 50 serving one robot loading location 14) are also possible. It is generally advantageous to have the robot bases 50 in the proximity of the robot loading locations 14, such that the robots do not have to travel great distances between the robot bases 50 and the robot loading locations 14.

Performance Simulation

A simulation was performed comparing the delivery by the combination of robots and vans according to the present technology described with reference to FIGS. 1 to 5 with classical van-only approaches.

Three delivery methods were simulated:
traditional delivery using vans only,
delivery using vans that are carrying robots already loaded with parcels/goods,
delivery using vans that are carrying a mixture of robots already loaded with parcels, and also individual parcels. As robots are completing their first deliveries, a robotic loading mechanism loads new parcels into robots at the same time as the van drives to next stop.

The following assumptions were used for the simulation:
Delivery density: 50 deliveries per square km. Random delivery addresses are selected with a semi-realistic urban/suburban road network map (such as the network 1000 depicted in FIGS. 1 to 4).
Average speed of van while driving: 25 km/h
Average speed of robot while driving: 4 km/h
Wait time for each delivery: 4 minutes. This is assumed to be equal for van-only method (courier ringing a doorbell) and robotic delivery (parcel recipient receiving a message on their phone and opening the robot).

It was assumed that the van has to travel a total of 25 min per way from a parcel center to the delivery area, that is to a point in the street network where the deliveries are to be made. This time is also referred to the time spent driving "stem miles" and it is assumed that this is the same for all approaches.

Classical Van-Only Approach

In the classical van-only approach, the van then visited all delivery addresses, which was modelled using a simple "traveling salesman" algorithm.

Robotic Approach

Robotic delivery is modelled with some pre-selected "robot drop locations" in the delivery area (about 5 locations per square km). These could be parking lots, gas stations, or just good safe locations for the van to stop and release or pick-up robots. The assumption was that these locations are static and are not selected for each day's delivery addresses in mind.

The van stops at these locations, releases the robots, picks up some other robots, and drives to another drop location. The van may either wait in the same location for the robots to come back or the van may drive to another drop location, and robots arrive at these next locations as they complete their deliveries, to be picked up by the van.

It is assumed that the van spends 2 minutes of overhead time at each drop location (e.g., parking the van, opening a ramp for robots to drive out, etc.), and robots are released or picked up in 12 seconds per robot.

Number of Robots in Van

One factor influencing delivery efficiency is the number of robots that fit into a van. Robots take more space inside the van than the parcels the robots transport; the outer dimensions of the robots were assumed to be 0.66m (L)× 0.56m (W)×0.56m (H). Therefore a 17 $m^3$ van could theoretically house a maximum of 17/(0.66*0.56*0.56)=82 robots. In practice the number is lower, because of various overheads, leeway, and ramps that take up space. Robots might be placed on a grid of 5 (L)×3 (W)×3 (H) robots, giving a maximum of 45 robots and also allowing space for ramps and for mechanisms or maneuvering of robots inside the van.

The simulations were therefore run with 30 and 40 robots in a van. If a way is found to fit more robots into a van, then robotic delivery may become even more advantageous.

Furthermore, a van carrying individual parcels in addition to robots was simulated. In such a van, the cargo space might be designed so that robots are in only the lowest floor, and parcels occupy the space above robots. Then there is no need for robots to be lifted by some mechanism, or robots driving up on ramps (which take up space). In this single floor, robots might be placed on a grid as 3*5=15, 3*6=18, or 4*6=24 robots.

Results

The simulations yielded the following results.

| Delivery method | Time per run, excluding stem miles (min) | Time for stem miles (min) | Total time per run (min) | Parcels delivered | Total time per parcel (min) |
|---|---|---|---|---|---|
| Classical (van carrying 97 parcels, no robots) | 430 | 50 | 480 | 97 | 4.9 |
| Van carrying 30 robots | 26 | 50 | 76 | 30 | 2.5 |
| Van carrying 40 robots | 30 | 50 | 70 | 40 | 1.8 |
| Van carrying 15 robots + 60 parcels | 97 | 50 | 157 | 75 | 2.1 |
| Van carrying 18 robots + 72 parcels | 94 | 50 | 144 | 90 | 1.6 |
| Van carrying 24 robots + 48 parcels | 61 | 50 | 111 | 72 | 1.5 |
| Van carrying 24 robots + 72 parcels | 90 | 50 | 140 | 96 | 1.5 |

The columns in the table above provide data about respective delivery runs for each simulation. Each delivery run starts from the warehouse, drives the stem miles (one way—25 minutes), delivers all the parcels in the van, and drives back the stem miles (another 25 minutes). For the classical baseline (van only), the delivery run lasts the whole workday (8 hours). That is, a total of 50 minutes for the stem miles and another 430 minutes for the delivery of the parcels, which is a total of 480 minutes or 8 hours.

For delivery methods using robots, the run is much shorter, although it delivers a relatively comparable number of parcels. This allows the van to do multiple delivery runs each day and substantially reduces the time needed per parcel.

As will be appreciated, the time needed to deliver a single parcel is a factor of 2 to 3 shorter than the time needed for the classical approach using a single van and no robots. Thus, the present technology results in an increased delivery speed. It will be appreciated that this may also result in reduced delivery costs.

It should be appreciated that whenever method steps are recited in a particular order herein, this does not necessitate that the steps need to be performed in such order, unless specifically stated or unless clear to the skilled person.

Any relative term such as "approximately", "about" should be construed to also include the exact term. That is, for example, "approximately 60" should also include (exactly) 60.

Below, further numbered embodiments of the invention will be discussed.

1. A method for delivering a plurality of items to a plurality of delivery locations (20, 22, 24), the method comprising
   a transport set comprising at least one mobile transport apparatus (10) comprising a first mobile transport apparatus (10), the first mobile transport apparatus (10) transporting a plurality of robots (30, 32, 34, 36, 38),
   the first mobile transport apparatus (10) travelling to a first robot drop location (4),
   a first robot set, which first robot set comprises at least one robot (30, 32, 34) being released from the first mobile transport apparatus (10) at the first robot drop location (4),
   each of the at least one robot (30, 32, 34) of the first robot set travelling from the first robot drop location (4) to a delivery location (20, 22, 24), respectively,
   each of the at least one robot (30, 32, 34) of the first robot set delivering an item of a first item set at the respective delivery location (20, 22, 24),
   each of the at least one robot (30, 32, 34) of the first robot set travelling to a robot pick-up location (4), respectively,
   each of the at least one robot (30, 32, 34) of the first robot set being collected into a mobile transport apparatus (10) at the respective robot pick-up location (4).

The transport set comprises at least one mobile transport apparatus, which at least one mobile transport apparatus comprises a first mobile transport apparatus. That is, the present technology may be employed with a single mobile transport apparatus or with a plurality of mobile transport apparatuses, such as 2, 3 or more mobile transport apparatuses.

The first item set is the set of items delivered by the first robot groups. That is, this item set may comprise one or more items. The robot pick-up location may be the same or different for different robots.

2. A method in accordance with the preceding embodiment, wherein the step of the first robot set being released from the first mobile transport apparatus (10) at the first robot drop location (4) includes the at least one robot (30, 32, 34) of the first robot set driving out of the first mobile transport apparatus (10).

3. A method in accordance with any of the preceding embodiments, wherein the step of the first robot set being released from the first mobile transport apparatus (10) at the first robot drop location (4) includes the at least one robot (30, 32, 34) of the first robot set being lifted out of the first mobile transport apparatus (10).

4. A method in accordance with any of the preceding embodiments, wherein the first robot drop location (4) is identical to the robot pick-up location (4) for at least one robot (30, 32, 34) of the first robot set.

5. A method in accordance with any of the preceding embodiments, wherein the first robot drop location (4) is not identical to the robot pick-up location (4) for at least one robot (30, 32, 34) of the first robot set.

6. A method in accordance with any of the preceding embodiments, wherein the method comprises the first mobile transport apparatus (10) travelling from the first robot drop location (4) to a second robot drop location (4) after the step of the first robot set being released from the first mobile transport apparatus (10) at the first robot drop location (4).

7. A method in accordance with the preceding embodiment, wherein the second robot drop location (4) is identical to the robot pick-up location (4) for at least one robot (30, 32, 34, 36, 38) of the first robot set.

8. A method in accordance with any of the 2 preceding embodiments, wherein the method comprises
   a second robot set comprising at least one robot (36, 38) being released from the first mobile transport apparatus (10) at the second robot drop location,
   each of the at least one robot (36, 38) of the second robot set travelling from the second robot drop location (4) to a delivery location (20, 22, 24), respectively,
   each of the at least one robot (36, 38) of the second robot set delivering an item of a second item set at the respective delivery location (20, 22, 24),
   each of the at least one robot (36, 38) of the second robot set travelling to a robot pick-up location (4), respectively,
   each of the at least one robot (36, 38) of the second robot set being collected into a mobile transport apparatus (10) at the respective robot pick-up location (4).

9. A method in accordance with the preceding embodiment, wherein the second robot set comprises at least two robots (36, 38).

10. A method in accordance with any of the 2 preceding embodiments, wherein the second robot drop location (4) is identical to the robot pick-up location (4) for at least one robot (36, 38) of the second robot set.

11. A method in accordance with any of the 3 preceding embodiments, wherein the second robot drop location (4) is not identical to the robot pick-up location (4) for at least one robot (36, 38) of the second robot set.

12. A method in accordance with any of the preceding embodiments, wherein the transport set comprises a second mobile transport apparatus,
    wherein the step of each of the at least one robot (30, 32, 34) of the first robot set being collected by a mobile transport apparatus (10) at the respective robot pick-up location (4) comprises at least one robot (30, 32, 34) of the first robot set being collected into the second mobile transport apparatus preceded by
    the second mobile transport apparatus travelling to the respective robot pick-up location (4).

13. A method in accordance with the preceding embodiment, wherein the method further comprises
    the second mobile transport apparatus transporting a plurality of robots,
    the second mobile transport apparatus travelling to a robot drop location,
    a set of the robots of the second mobile transport apparatus being released from the second mobile transport apparatus at the robot drop location, wherein the set of the robots of the second mobile transport apparatus comprises at least one robot,
    each of the at least one robot of the set of the robots of the second mobile transport apparatus travelling from the robot drop location to a delivery location, respectively,
    each of the at least one robot of the set of the robots of the second mobile transport apparatus delivering an item at the respective delivery location,
    each of the at least one robot of the set of the robots of the second mobile transport apparatus travelling to a robot pick-up location, respectively,
    each of the at least one robot of the set of the robots of the second mobile transport apparatus being collected into a mobile transport apparatus at the respective robot pick-up location.

14. A method in accordance with the preceding embodiment, wherein the set of the robots of the second mobile transport apparatus comprises at least two robots.

15. A method in accordance with any of the preceding embodiments, wherein the method comprises loading at least one item into a robot (30, 32, 34, 36, 38), wherein said loading is performed within a mobile transport apparatus (10).

16. A method in accordance with the preceding embodiment, wherein said loading is performed autonomously.

In other words, said loading is performed without a human being present in the cargo area of the transport apparatus.

17. A method in accordance with any of the 2 preceding embodiments when dependent on embodiment 6, wherein said loading is performed while the respective mobile transport apparatus (10) travels from the first robot drop location (4) to the second robot drop location (4).

18. A method in accordance with any of the 3 preceding embodiments, wherein said loading is performed with a robot (30, 32, 34) of the first robot set after said robot (30, 32, 34) has delivered the respective item of the first item set, has traveled to the respective robot pick-up location (4) and has been collected into the first mobile transport apparatus (10) at the respective robot pick-up location (4).

19. A method in accordance with any of the preceding embodiments, wherein the robot drop locations (4) and the robot pick-up locations (4) are pre-selected.

20. A method for delivering a plurality of items to a plurality of delivery locations (20, 22, 24), the method comprising
    a transport set comprising at least one mobile transport apparatus (10) comprising a first mobile transport apparatus (10), the first mobile transport apparatus (10) transporting items,
    the first mobile transport apparatus (10) travelling to a first robot loading location (14),
    a first robot set, which first robot set comprises at least one robot (30, 32, 34), travelling to the first robot loading location (14),
    the at least one robot (30, 32, 34) of the first robot set being loaded with at least one item of a first item set at the first robot loading location (14),
    each of the at least one robot (30, 32, 34) of the first robot set travelling from the first robot loading location (14) to a delivery location (20, 22, 24), respectively,
    each of the at least one robot (30, 32, 34) of the first robot set delivering an item of the first item set at the respective delivery location (20, 22, 24),
    each of the at least one robot (30, 32, 34) of the first robot set leaving the respective delivery location (20, 22, 24).

21. A method in accordance with the preceding embodiment, wherein the method further comprises
    at least one robot (30, 32, 34) of the first robot set travelling to a second robot loading location (4) after delivering the item of the first item set at the respective delivery location (20, 22, 24).

22. A method in accordance with the preceding embodiment, wherein the method further comprises
    the at least one robot (30, 32, 34) being loaded with at least one item of a second item set at the second robot loading location (14),
    each of the at least one robot (30, 32, 34) travelling from the second loading location (14) to a delivery location (20, 22, 24), respectively,
    each of the at least one robot (30, 32, 34) delivering an item of the second item set at the respective delivery location (20, 22, 24),
    each of the at least one robot (30, 32, 34) of the first robot set leaving the respective delivery location (20, 22, 24).

23. A method in accordance with the preceding embodiment,
    wherein the second robot loading location (14) is identical to the first robot loading location (14).

24. A method in accordance with any of embodiments 20 to 22, wherein the method further comprises
    the first mobile transport apparatus (10) travelling from the first robot loading location (14) to the second robot loading location (14), wherein the second robot loading location (14) is not identical to the first robot loading location (14), after the at least one robot (30, 32, 34) of the first robot set being loaded with at least one item of the first item set at the first robot loading location (14).

25. A method in accordance with the preceding embodiment, wherein the method further comprises
    a second robot set, which second robot set comprises at least one robot (30, 32, 34), travelling to the second robot loading location (14), the at least one robot (30, 32, 34) of the second robot set being loaded with at least one item of an item set at the second robot loading location (14), each of the at least one robot (30, 32, 34) of the second robot set travelling from the second robot loading location (14) to a delivery location (20, 22, 24), respectively, each of the at least one robot (30, 32, 34) of the second robot set delivering an item of the item set at the respective delivery location (20, 22, 24), each of the at least one robot (30, 32, 34) of the second robot set leaving the respective delivery location (20, 22, 24).

26. A method in accordance with the preceding embodiment, wherein the second robot set comprises at least two robots (30, 32, 34).

27. A method in accordance with any one of the embodiments 20 to 26, wherein the first robot set travels from a first home base (50) to the first robot loading location (14).

28. A method in accordance with any one of the embodiments 20 to 27 and further comprising each of the robots (30, 32, 34) travelling to a respective home base after leaving a delivery location.

29. A method in accordance with any one of the embodiments 20 to 28, wherein the step of the at least one robot (30, 32, 34) being loaded with at least one item of a first item set at the first robot loading location (14) comprises the at least one robot (30, 32, 34) driving into or being lifted into the first mobile transport apparatus (10) and being loaded with at least one item while being in the first mobile transport apparatus (10).

30. A method in accordance with any one of the embodiments 20 to 29, wherein the step of the at least one robot (30, 32, 34) being loaded with at least one item of a first item set at the first robot loading location (14) is performed autonomously.

31. A method in accordance with any one of the embodiments 20 to 30, wherein the transport set comprises a second mobile transport apparatus transporting items, wherein the method further comprises the second mobile transport apparatus travelling to the second robot loading location (14).

32. A method in accordance with any one of the embodiments 20 to 31, wherein the robot loading location(s) (14) is/are pre-selected.

33. A method in accordance with the any one of preceding embodiments, wherein the first robot set comprises at least two robots (30, 32, 34).

34. A method in accordance with any of the preceding embodiment, wherein the items comprise parcels.

35. A method in accordance with any of the preceding embodiments, wherein each of the at least one mobile transport apparatus (10) is a truck or a van and/or wherein each of the at least one mobile transport apparatuses (10) comprises a cargo platform, which may be fenced.

36. A method in accordance with any of the preceding embodiments, wherein each of at least one mobile transport apparatuses (10) has a cargo volume in the range of 5 to 30 m³, preferably 10 to 25 m³, further preferably 15 to 20 m³, such as 17 m³.

37. A method in accordance with any of the preceding embodiments, wherein each of the at least one mobile transport apparatuses (10) is an autonomously or semi-autonomously driving vehicle.

38. A method in accordance with any of the preceding embodiments, wherein the at least one mobile transport apparatus (10) and the robots (30, 32, 34, 36, 38) communicate with a server.

That is, the mobile transport apparatus and the robots transmit information/data to a server and receive information/data from the server.

39. A method in accordance with the preceding embodiment, wherein the server calculates the travel routes for the at least one mobile transport apparatus (10) and the robots (30, 32, 34, 36, 38).

40. A method in accordance with the preceding embodiment, wherein the travel routes are constantly updated.

41. A method in accordance with any of the preceding embodiments, wherein the robots (30, 32, 34, 36, 38) are autonomously or semi-autonomously driving robots.

42. A method in accordance with any of the preceding embodiments, wherein the robots (30, 32, 34, 36, 38) have a width in the range of 20 to 100 cm, preferably 40 to 70 cm, such as about 55 cm.

43. A method in accordance with any of the preceding embodiments, wherein the robots (30, 32, 34, 36, 38) have a height in the range of 20 to 100 cm, preferably 40 to 70 cm, such as about 60 cm.

44. A method in accordance with any of the preceding embodiments, wherein the robots (30, 32, 34, 36, 38) have a length in the range of 30 to 120 cm, preferably 50 to 80 cm, such as about 65 cm.

45. A method in accordance with any of the preceding embodiments, wherein the robots (30, 32, 34, 36, 38) have a weight in the range of 2 to 50 kg, preferably in 5 to 40 kg, more preferably 7 to 25 kg, such as 10 to 20 kg.

46. A method in accordance with any of the preceding embodiments, wherein the robots (30, 32, 34, 36, 38) are land-based robots.

47. A method in accordance with any of the preceding embodiments, wherein the robots (30, 32, 34, 36, 38) are adapted not to travel with a speed exceeding 10 km/h, preferably 8 km/h, more preferably 6 km/h.

48. A method in accordance with any of the preceding embodiments, wherein the robots (30, 32, 34, 36, 38) are adapted to assume an open and a closed configuration, the open configuration allowing access to a compartment within the robot (30, 32, 34, 36, 38) and the closed configuration not allowing access to the compartment, wherein the step of each of the at least one robot (30, 32, 34) delivering an item at the respective delivery location (20, 22, 24) includes the respective robot (30, 32, 34) changing from the closed configuration to the open configuration.

49. A method in accordance with the preceding embodiment, wherein the robots (30, 32, 34, 36, 38) each comprise an electronic lock and the lock is locked in the closed configuration and unlocked in the open configuration.

Below, system embodiments will be mentioned. Such embodiments are marked by the letter "S" followed by a number. When reference is made to system embodiments, such embodiments marked with an "S" followed by a number are referred to.

S1. A system for delivering a plurality of items to a plurality of delivery locations, the system comprising a plurality of robots (30, 32, 34, 36, 38), each adapted to deliver an item at a respective delivery location and a transport set comprising at least one mobile transport apparatus (10) adapted to transport the plurality of robots (30, 32, 34, 36, 38) and/or load items into the plurality of robots (30, 32, 34, 36, 38).

S2. A system in accordance with the preceding embodiment, wherein the system further comprises
a server, wherein the server, the plurality of robots (30, 32, 34, 36, 38) and the at least one mobile transport apparatus (10) are configured for communication between the server and the plurality of robots (30, 32, 34, 36, 38) and between the server and the at least one mobile transport apparatus (10).

S3. A system in accordance with the preceding embodiment, wherein the server is configured to calculate and adjust the travel routes for the at least one mobile transport apparatus (10) and the robots (30, 32, 34, 36, 38).

S4. A system in accordance with any of the preceding system embodiments, wherein the at least one mobile transport apparatus (10) comprises a truck or a van and/or at least one mobile transport apparatus (10) comprises a cargo platform, which may be fenced.

S5. A system in accordance with any of the preceding system embodiments, wherein at least one mobile transport apparatus (10) has a cargo volume in the range of 5 to 30 m$^3$, preferably 10 to 25 m$^3$, further preferably 15 to 20 m$^3$, such as 17 m$^3$.

S6. A system in accordance with any of the preceding system embodiments, wherein at least one mobile transport apparatus (10) is an autonomously or semi-autonomously driving vehicle.

S7. A system in accordance with any of the preceding system embodiments, wherein at least one mobile transport apparatus (10) includes a ramp via which the robots (30, 32, 34, 36, 38) may enter and exit the mobile transport apparatus (10).

S8. A system in accordance with any of the preceding system embodiments, wherein at least one mobile transport apparatus comprises a lift for lifting the robots (30, 32, 34, 36, 38) out of and/or into the mobile transport apparatus (10).

S9. A system in accordance with any of the preceding system embodiments, wherein the system comprises a loading apparatus for loading items into the robots (30, 32, 34, 36, 38), which loading apparatus is located inside one of the at least one of the mobile transport apparatus (10).

S10. A system in accordance with the preceding embodiment, wherein the loading apparatus is a robotic and/or automatic loading mechanism.

S11. A system in accordance with any of the preceding system embodiments, wherein the robots (30, 32, 34, 36, 38) have a width in the range of 20 to 100 cm, preferably 40 to 70 cm, such as about 55 cm.

S12. A system in accordance with any of the preceding system embodiments, wherein the robots (30, 32, 34, 36, 38) have a height in the range of 20 to 100 cm, preferably 40 to 70 cm, such as about 60 cm.

S13. A system in accordance with any of the preceding system embodiments, wherein the robots (30, 32, 34, 36, 38) have a length in the range of 30 to 120 cm, preferably 50 to 80 cm, such as about 65 cm.

S14. A system in accordance with any of the preceding system embodiments, wherein the robots (30, 32, 34, 36, 38) have a weight in the range of 2 to 50 kg, preferably in 5 to 40 kg, more preferably 7 to 25 kg, such as 10 to 20 kg.

S15. A system in accordance with any of the preceding system embodiments, wherein the robots (30, 32, 34, 36, 38) are land-based robots.

S16. A system in accordance with any of the preceding system embodiments, wherein the robots (30, 32, 34, 36, 38) are adapted not to travel with a speed exceeding 10 km/h, preferably 8 km/h, more preferably 6 km/h.

S17. A system in accordance with any of the preceding system embodiments, wherein the robots (30, 32, 34, 36, 38) are adapted to assume an open and a closed configuration, the open configuration allowing access to an interior portion of the robots (30, 32, 34, 36, 38) and the closed configuration not allowing access to the interior portion.

S18. A system in accordance with the preceding embodiment, wherein the robots (30, 32, 34, 36, 38) each comprise an electronic lock and wherein the lock is locked in the closed configuration and unlocked in the open configuration.

S19. A system in accordance with any of the preceding system embodiments, wherein the transport set comprises a plurality of mobile transport apparatuses (10) each adapted to transport a plurality of robots (30, 32, 34, 36, 38).

What is claimed is:

1. A method for delivering a plurality of items loaded onto a first mobile transport apparatus (10) to a plurality of delivery locations (20, 22, 24), the method comprising
the first mobile transport apparatus (10) travelling to a first robot loading location (14),
a first robot set comprising at least one robot (30, 32, 34), travelling to the first robot loading location (14) to meet the first mobile transport apparatus (10), each robot of the first robot set having a compartment for accommodating an item to be delivered, the compartment having an open configuration in which access to the item is allowed, and a closed configuration in which access to the item is not allowed,
at the first robot loading location (14), loading each robot (30, 32, 34) of the first robot set with a respective first item for delivery from the first mobile transport apparatus,
after being loaded with its respective first item, each robot (30, 32, 34) of the first robot set travelling from the first robot loading location (14) to a respective first delivery location (20, 22, 24) with its compartment in the closed configuration,
at said respective first delivery location (20, 22, 24), each robot (30, 32, 34) of the first robot set opening the compartment to permit access to its respective item only upon a delivery recipient taking a predetermined action, and delivering its respective first item to the delivery recipient,
after delivering its respective first item, each robot (30, 32, 34) of the first robot set travelling by itself to a predetermined second robot loading location (14') different from the first robot loading location for reloading with one or more additional items for delivery;
after loading each robot of (30, 32, 34) of the first robot set at the first robot loading location, the first mobile transport apparatus travelling to said predetermined second robot loading location; and
at said predetermined second robot loading location, the first mobile transport apparatus stopping and waiting for one or more empty robots of the first robot set;
wherein:
the robots of the first robot set are land-based robots adapted to traverse ground, but not traverse air;
each robot of the first robot set is configured to travel autonomously, and
the method further comprises controlling said each robot by a remote operator, if that robot is faced with having to cross a street.

2. The method according to claim 1, further comprising:
at the predetermined second robot loading location (14'), loading each robot of the first robot set with a respective second item for delivery to a respective second delivery location; and
after being loaded with its respective second item, each robot of the first robot set travelling from the predetermined second robot loading location (14') to its respective second delivery location and delivering its respective second item at its respective second delivery location; and
after delivering its respective second item, each robot of the first robot set leaving its respective second delivery location.

3. The method according to claim 2, comprising the first robot set traveling from a first home base (50) to the first robot loading location (14), to meet the first mobile transport apparatus (10).

4. The method according to claim 2, comprising calculating and constantly updating travel routes for the first mobile transport apparatus (10) and for the robots (30, 32, 34).

5. The method according to claim 2, wherein: each robot of the first robot set travels to its respective first delivery location at a speed not exceeding 10 km/h.

6. The method according to claim 1, wherein each of the robots (30, 32, 34) comprises 6 wheels (304).

7. The method according to claim 1, wherein:
the first mobile transport apparatus (10) and the at least one robot (30, 32, 34) communicate with a server; and
the server is configured to check up to date road traffic and/or road information and reroute at least one robot of the first robot set, in response to said road traffic and/or road information.

8. The method according to claim 1, wherein the remote operator controls said each robot, if that robot is faced with having to cross a street having vehicles thereon.

9. The method according to claim 1, further comprising a second mobile transport apparatus travelling to the same predetermined second robot loading location to which the first mobile transport apparatus and robots of the first robot set travel.

10. The method according to claim 1, further comprising:
a second robot set comprising a plurality of robots travelling to said predetermined second robot loading location;
at said predetermined second robot loading location, loading each robot of the second robot set with at least one delivery item;
each robot of the second robot set travelling from the second robot loading location to a respective delivery location; and
each robot of the second robot set delivering said delivery item and then leaving said respective delivery location.

11. A method for delivering a plurality of items loaded onto a first mobile transport apparatus (10) to a plurality of delivery locations (20, 22, 24), the method comprising
the first mobile transport apparatus (10) travelling to a first robot loading location (14),
a first robot set comprising at least one robot (30, 32, 34), travelling to the first robot loading location (14) to meet the first mobile transport apparatus (10), each robot of the first robot set having a compartment for accommodating an item to be delivered, the compartment having an open configuration in which access to the item is allowed, and a closed configuration in which access to the item is not allowed,
at the first robot loading location (14), loading each robot (30, 32, 34) of the first robot set with a respective first item for delivery from the first mobile transport apparatus,
after being loaded with its respective first item, each robot (30, 32, 34) of the first robot set travelling from the first robot loading location (14) to a respective first delivery location (20, 22, 24) with its compartment in the closed configuration,
at said respective first delivery location (20, 22, 24), each robot (30, 32, 34) of the first robot set opening the compartment to permit access to its respective item only upon a delivery recipient taking a predetermined action, and delivering its respective first item to the delivery recipient,
after delivering its respective first item, each robot (30, 32, 34) of the first robot set travelling by itself to a predetermined second robot loading location (14') different from the first robot loading location, for reloading with one or more additional items for delivery;
after loading each robot of (30, 32, 34) of the first robot set at the first robot loading location, the first mobile transport apparatus travelling to said predetermined second robot loading location; and
at said predetermined second robot loading location, the first mobile transport apparatus meeting and loading at least one robot from a second robot set different from the first robot set:
wherein:
the robots of the first robot set are land-based robots adapted to traverse ground, but not traverse air;
each robot of the first robot set is configured to travel autonomously;
the first mobile transport apparatus (10) and the at least one robot (30, 32, 34) communicate with a server;
the server calculates and updates travel routes for the at least one mobile transport apparatus (10) and also the at least one robot (30, 32, 34); and
the method further comprises controlling said each robot by a remote operator, if that robot is faced with having to cross a street.

12. The method according to claim 11, wherein the travel routes are constantly updated.

13. The method according to claim 12, comprising the server checking up to date road traffic and/or roads information and rerouting at least the first mobile transport apparatus and/or the robots of the first robot set.

14. The method according to claim 12, wherein the server is configured to calculate and adjust travel routes for the at least one mobile transport apparatus and the robots in the first robot set.

15. The method according to claim 12, comprising changing the drop and pick-up locations to thereby optimize the total time travelled by both the first mobile transport apparatus and robots of the first robot set.

16. The method according to claim 12, wherein:
the server is configured to check up to date road traffic and/or road information and reroute at least one robot of the first robot set, in response to said road traffic and/or road information.

17. The method according to claim 11, further comprising:
at the predetermined second robot loading location (14'), loading each robot of the first robot set with a respective second item for delivery to a respective second delivery location; and after being loaded with its respective second item, each robot of the first robot set traveling from the predetermined second robot loading location (14') to its respective second delivery location and delivering its respective second item at its respective second delivery location; and after delivering its respective second item, each robot of the first robot set leaving its respective second delivery location.

18. The method according to claim 17, comprising the first robot set traveling from a first home base (50) to the first robot loading location (14), to meet the first mobile transport apparatus (10).

19. The method according to claim 17, wherein: each robot of the first robot set travels to its respective first delivery location at a speed not exceeding 10 km/h.

20. The method according to claim 11, wherein each of the robots (30, 32, 34) comprises 6 wheels (304).

21. The method according to claim 11, wherein the remote operator controls said each robot, if that robot is faced with having to cross a street having vehicles thereon.

22. The method according to claim 11, further comprising a second mobile transport apparatus travelling to the same predetermined second robot loading location to which the first mobile transport apparatus and robots of the first robot set travel.

23. The method according to claim 11, comprising:
a plurality of robots from the second robot set travelling to said predetermined second robot loading location, for loading by said first mobile transport apparatus with at least one delivery item;
each robot of the second robot set travelling from the second robot loading location to a respective delivery location; and
each robot of the second robot set delivering said delivery item and then leaving said respective delivery location.

24. A method for delivering a plurality of items loaded onto a first mobile transport apparatus (10) to a plurality of delivery locations (20, 22, 24), the method comprising
the first mobile transport apparatus (10) travelling to a first robot loading location (14),
a first robot set comprising at least one robot (30, 32, 34), travelling to the first robot loading location (14) to meet the first mobile transport apparatus (10), each robot of the first robot set having a compartment for accommodating an item to be delivered, the compartment having an open configuration in which access to the item is allowed, and a closed configuration in which access to the item is not allowed,
at the first robot loading location (14), loading each robot (30, 32, 34) of the first robot set with a respective first item for delivery from the first mobile transport apparatus,
after being loaded with its respective first item, each robot (30, 32, 34) of the first robot set travelling from the first robot loading location (14) to a respective first delivery location (20, 22, 24) with its compartment in the closed configuration,
at said respective first delivery location (20, 22, 24), each robot (30, 32, 34) of the first robot set opening the compartment to permit access to its respective item only upon a delivery recipient taking a predetermined action, and delivering its respective first item to the delivery recipient,
after delivering its respective first item, each robot (30, 32, 34) of the first robot set travelling by itself to a predetermined second robot loading location (14') different from the first robot loading location for reloading with one or more additional items for delivery;
after loading each robot of (30, 32, 34) of the first robot set at the first robot loading location, the first mobile transport apparatus travelling to said predetermined second robot loading location; and
at said predetermined second robot loading location, the first mobile transport apparatus stopping and waiting for one or more empty robots of the first robot set;
wherein:
the robots of the first robot set are land-based robots adapted to traverse ground, but not traverse air;
each robot of the first robot set is configured to travel autonomously;
each of the robots (30, 32, 34) comprises 6 wheels (304);
each robot of the first robot set travels to its respective first delivery location at a speed not exceeding 10 km/h; and
the method further comprises controlling said each robot by a remote operator, if that robot is faced with having to cross a street.

25. The method according to claim 24, wherein:
the first mobile transport apparatus (10) and the at least one robot (30, 32, 34) communicate with a server;
the server is configured to check up to date road traffic and/or road information and reroute at least the first mobile transport apparatus and/or the robots of the first robot set.

26. The method according to claim 25, further comprising:
at the predetermined second robot loading location (14'), loading each robot of the first robot set with a respective second item for delivery to a respective second delivery location;
after being loaded with its respective second item, each robot of the first robot set travelling from the predetermined second robot loading location (14') to its respective second delivery location and delivering its respective second item at its respective second delivery location;
after delivering its respective second item, each robot of the first robot set leaving its respective second delivery location.

27. The method according to claim 24, wherein:
the first mobile transport apparatus (10) and the at least one robot (30, 32, 34) communicate with a server; and
the server is configured to check up to date road traffic and/or road information and reroute at least one robot of the first robot set, in response to said road traffic and/or road information.

28. The method according to claim 24, wherein the remote operator controls said each robot, if that robot is faced with having to cross a street having vehicles thereon.

29. The method according to claim 24, further comprising a second mobile transport apparatus travelling to the same predetermined second robot loading location to which the first mobile transport apparatus and robots of the first robot set travel.

30. The method according to claim 24, further comprising:
a second robot set comprising a plurality of robots, travelling to said predetermined second robot loading location;
at said predetermined second robot loading location, loading each robot of the second robot set with at least one delivery item;

each robot of the second robot set travelling from the second robot loading location to a respective delivery location; and each robot of the second robot set delivering said delivery item and then leaving said respective delivery location.

* * * * *